US011033846B2

(12) United States Patent
Haas et al.

(10) Patent No.: US 11,033,846 B2
(45) Date of Patent: Jun. 15, 2021

(54) PANEL FILTER WITH MOLDED FRAME AND INTEGRAL SEAL

(71) Applicant: Clarcor Air Filtration Products, Inc., Jeffersonville, IN (US)

(72) Inventors: Daniel R. Haas, Crestwood, KY (US); LaMonte A. Crabtree, Louisville, KY (US); Hershel E. Fancher, Georgetown, IN (US)

(73) Assignee: Parker-Hannifin Corporation, Cleveland, OH (US)

(*) Notice: Subject to any disclaimer, the term of this patent is extended or adjusted under 35 U.S.C. 154(b) by 204 days.

(21) Appl. No.: 16/076,579

(22) PCT Filed: Feb. 7, 2017

(86) PCT No.: PCT/US2017/016832
§ 371 (c)(1),
(2) Date: Aug. 8, 2018

(87) PCT Pub. No.: WO2017/139268
PCT Pub. Date: Aug. 17, 2017

(65) Prior Publication Data
US 2019/0046909 A1    Feb. 14, 2019

Related U.S. Application Data

(60) Provisional application No. 62/293,227, filed on Feb. 9, 2016.

(51) Int. Cl.
*B01D 46/00* (2006.01)
*B01D 46/10* (2006.01)
(Continued)

(52) U.S. Cl.
CPC ..... *B01D 46/0005* (2013.01); *B01D 46/0001* (2013.01); *B01D 46/0002* (2013.01);
(Continued)

(58) Field of Classification Search
CPC .......... B01D 46/0001; B01D 46/0002; B01D 46/0005; B01D 46/10; B01D 46/521; B01D 46/523; B01D 2271/025; B29C 45/14

See application file for complete search history.

(56) References Cited

U.S. PATENT DOCUMENTS 5,290,447 A    3/1994  Lippold
5,804,014 A    9/1998  Kähler
(Continued)

FOREIGN PATENT DOCUMENTS

AU    724309 B2    9/2000
CN    102458608 A    5/2012
(Continued)

OTHER PUBLICATIONS

U.S. Appl. No. 62/243,740, Haas et al., filed Oct. 20, 2015.

*Primary Examiner* — Robert Clemente
(74) *Attorney, Agent, or Firm* — Reinhart Boerner Van Deuren P.C.

(57) ABSTRACT

A filter cartridge is provided. The filter cartridge includes a filter element comprising a filter media, and the filter element extends between an inlet face and an outlet face. The filter element defines a periphery surrounding the filter media. The filter cartridge also includes a border frame including a plurality of side panels, and the side panels are independently molded-in-place along the periphery of the filter element. Adjacent members of the side panels are joined together along a plurality of mold interface seams, and the mold interface seams are spaced around the periphery. The plurality of side panels are embedded in and seal the periphery of the filter element such that fluid flow inside the border frame is directed to pass through the filter media for filtering in order to pass from the inlet face to the outlet face.

40 Claims, 19 Drawing Sheets

(51) Int. Cl.
*B01D 46/52* (2006.01)
*B29C 45/14* (2006.01)

(52) U.S. Cl.
CPC ............ *B01D 46/10* (2013.01); *B01D 46/523* (2013.01); *B29C 45/14* (2013.01); *B01D 2271/025* (2013.01)

(56) References Cited

U.S. PATENT DOCUMENTS

| | | | |
|---|---|---|---|
| 5,840,094 A | 11/1998 | Osendorf et al. | |
| 5,902,361 A | 5/1999 | Pomplun et al. | |
| 6,004,367 A | 12/1999 | Stopyra et al. | |
| 6,685,833 B2 | 2/2004 | Lippold | |
| 2004/0065066 A1 | 4/2004 | Mertz et al. | |
| 2005/0284116 A1 | 12/2005 | Duffy | |
| 2008/0135499 A1 | 6/2008 | Gagnon et al. | |
| 2009/0126326 A1* | 5/2009 | McClellan | B01D 46/0005 55/497 |
| 2009/0320423 A1 | 12/2009 | Merritt et al. | |
| 2012/0317940 A1 | 12/2012 | Ball et al. | |
| 2012/0324848 A1* | 12/2012 | Enbom | B01D 46/521 55/483 |
| 2014/0165839 A1 | 6/2014 | Crabtree | |
| 2014/0260139 A1 | 9/2014 | Merritt et al. | |

FOREIGN PATENT DOCUMENTS

| | | |
|---|---|---|
| CN | 104056509 A | 9/2014 |
| DE | 19755466 A1 | 6/1999 |
| EP | 1464372 A1 | 10/2004 |
| WO | WO 99/20450 A1 | 4/1999 |
| WO | WO 2006/136770 A1 | 12/2006 |
| WO | WO 2017/031168 A1 | 2/2017 |

* cited by examiner

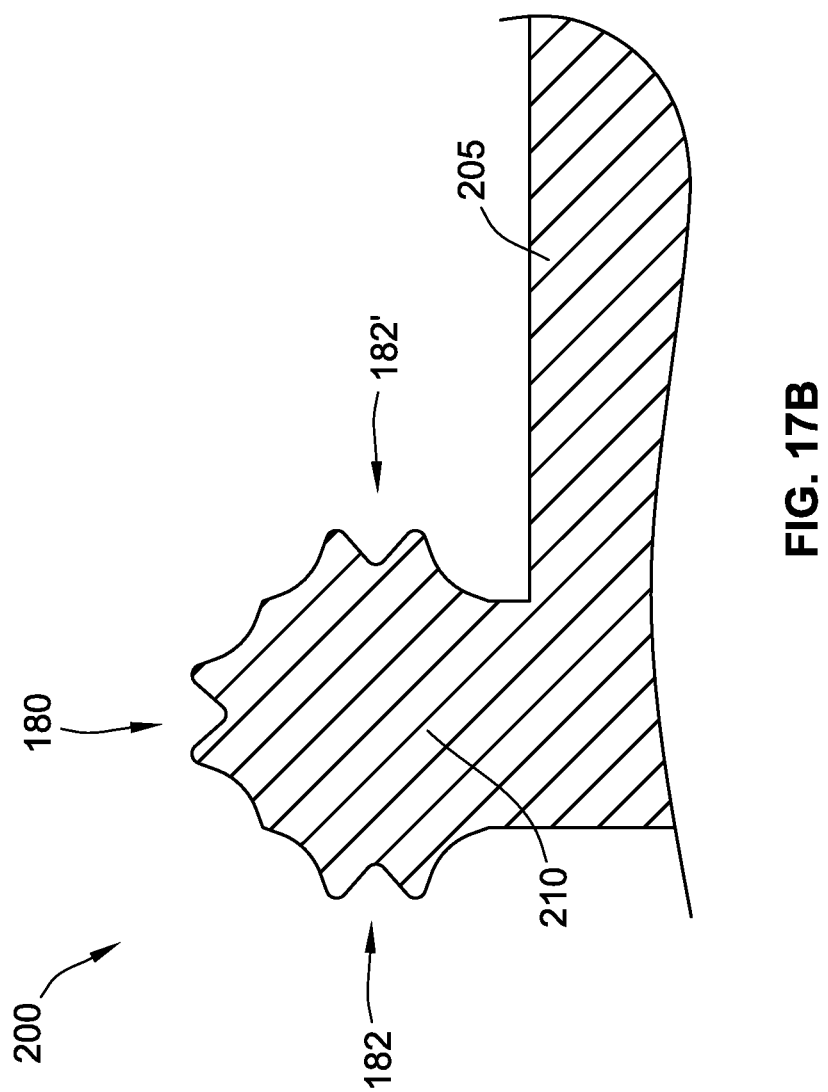

PANEL FILTER WITH MOLDED FRAME AND INTEGRAL SEAL

FIELD OF THE INVENTION

This invention generally relates to filters, and more particularly, to molded in place border frame features of panel air filters.

BACKGROUND OF THE INVENTION

When air containing particulate matter passes through a filter, the filter removes a substantial portion of that particulate matter. In order to provide the most effective capture of particulate matter, leak paths should be prevented.

Leak paths through a filter can occur in a variety of ways. First, leak paths can be created where the filter media is joined to the frame. If the filter media is not fully sealed to the frame panels, then particulate matter may bypass the filter media in regions where the filter media is not sealed to the frame. Second, leak paths can occur at the corners of a filter in regions where gaps exist between the frame panels on each side of the filter. Third, leak paths can occur if the filter and the filter housing into which the filter is mounted are not perfectly matched in geometry. For instance, if the filter mounting has become warped or contorted as the result of swelling or temperature fluctuations, then the filter element may not fit snugly within the mounting.

Accordingly, reducing or limiting potential leak paths is often desirable.

Additionally, the cost of such filters is desirably low as filters are replaced at regular intervals. Further, ease of manufacturability in this regard should be taken into account for reliability and cost reasons. Sometimes incinerability of the air filters is also desired.

While molded border frames have been used or proposed on air filters in the past, various manufacturability, cost, and/or reliability advantages of molded in place border frames not previously realized in the art can be realized with different aspects or embodiments of the present invention as presented below, thus demonstrating such shortcomings in the state of the art.

BRIEF SUMMARY OF THE INVENTION

The inventive aspects and embodiments discussed below in the following separate paragraphs of the summary may be used independently or in combination with each other.

In one aspect, embodiments of a filter cartridge are provided. The filter cartridge includes a filter element including a filter media in which the filter element extends between an inlet face and an outlet face. The filter element defines a periphery surrounding the filter media. The filter cartridge also includes a border frame including a plurality of side panels. The side panels are independently molded-in-place along the periphery of the filter element. Adjacent members of the side panels are joined together along a plurality of mold interface seams, and the mold interface seems are spaced around the periphery. The plurality of side panels are embedded in and seal the periphery of the filter element such that fluid flow inside the border frame is directed to pass through the filter media for filtering in order to pass from the inlet face to the outlet face.

According to certain embodiments, the filter element preferably comprises a pleated filter media pack. The pleated filter media pack includes a plurality of pleats. The pleats include a plurality of pleat flanks extending between first pleat tips disposed at the inlet face and second pleat tips disposed at the outlet face.

The filter element can be rectangular with four corners such that the plurality of side panels includes four side panels and four mold interface seams and such that each mold interface seam is proximate and within two inches of one of the four corners.

To provide for structural integrity, the side panels can have non-linear ends at each seam, and each non-linear end forms a geometric and mechanical interlock at each seam.

For example, in one embodiment, the non-linear ends are dovetail joints, and each dovetail joint includes at least one tongue and at least one groove that are interlocking.

Another feature of some embodiments is that an outer surface of the border frame may define a surface step of between 1 micron and 1 millimeter as a result of the side panels being independently molded-in-place along the periphery of the filter element. The surface profile step is defined at the mold interface seams and extends from the inlet face to the outlet face.

The filter cartridge can be free of metal structural supports and free of plastic structural supports. It may, therefore, be more environmentally friendly and/or incinerable if desired while providing adequate filter support.

According to certain embodiments, the inlet face extends in an inlet plane, and the outlet face extends in an outlet plane spaced from the inlet face. The border frame extends between the inlet face and the outlet face and is at least coplanar or beyond the inlet plane and the outlet plane.

Each of the side panels may comprise a molded exterior surface facing away from the filter element, a molded inlet edge surface extending over and above the inlet plane, molded outlet edge surface extending over and above the outlet plane, and an irregular expanded surface into which the filter element is embedded and sealed. The molded exterior surface extends between and connects between the molded outlet edge surface and the molded inlet edge surface, and each side panel defines an average depth between the molded exterior surface and the irregular expanded surface of between ⅛ inch and 2 inches.

According to a preferred aspect, the side panels comprise a molded polymeric material including at least one of polyurethane, urethane, plastisol, silicone, and synthetic and/or natural rubber materials, the polymeric material have a Shore00 durometer of between 20 and 70.

The filter may integrally provide a seal as well. For example, the filter cartridge further includes an axial seal and a radial seal in spaced relation from the axial seal. Each of the radial seal and the axial seal is in the form of a seal projection forming a ring around the border frame. The axial seal is joined to and projecting outward from at least one of the molded inlet edge surface and the molded outlet edge surface. The radial seal projects outward from the molded exterior surface.

The side panels can be overmolded over each other at the mold interface seams.

Further, the side panels are preferably embedded and in direct contact with the filet media.

For most typical air filtration applications, the filter media has the following properties: a basis weight of between 0.3 and 3.0 ounces/square yard; an air permeability of between 10 and 500 cfm @ ½ inch of water column pressure, measured according to ASTM D737; and a MERV (Minimum Efficiency Reporting Value) rating of between 5 and 16 according to ASHRAE 52.1.

The border frame may be somewhat flexible. Preferably, some support is therefore provided to the media.

For example, the filter media may be embossed media having a plurality of embossments extending between the inlet face and the outlet face. The filter media may further include adhesive seal beads applied to the filter media and supporting and maintaining the filter element in a predetermined shape.

When integral seals are provided in embodiments, the border frame can include a molded seal comprising seal sections that are separately and independently molded and joined at the mold interface seams. Each separately molded seal section can be defined by one of the side panels, and each separately molded seal section can be joined and aligned with two adjacent members of the seal sections. The seal sections can be unitarily molded with a remainder of each side panel and not separately attached, and the side panels and the seal can be unitarily molded together with a polymeric material having a Shore00 durometer of between 20 and 70.

Additionally, the seal sections can be molded from a different material than the rest of the side panel.

Furthermore, the seal sections can be molded from a softer material than the rest of the side panel.

In specific embodiments, the seal sections have a Shore00 durometer of 20 or less than the Shore00 durometer of the rest of the side panel.

Further, the molded seal can include a plurality of molded seal members in spaced relation, and each molded seal member can be in the form of a seal projection forming a ring around the border frame.

In some configurations, the seal members and the filter media are sufficient to provide HEPA (High Efficiency Particulate Air) filtration according to LEST RP-CC001 when the filter cartridge is inserted into a filter housing.

For example, the molded seal members can include a first axial seal member projecting axially above or below one of the inlet face and outlet face, and a second radial seal member can project radially and transversely relative to the first axial seal member radially outwardly from the filter element. This provides different sealing options or may be used for two seals at once when installed.

Alternatively, metal or plastic scrims or support screens may also be copleated or bonded over pleat tips at one or both flow faces. However, preferred embodiments do not need such support, thereby avoiding additional cost and providing better incinerability or environmentally friendliness.

As another example, the plurality of molded seal members in spaced relation includes at least one pair of: (i) at least two axial seals and (ii) at least two radial seals. The at least one pair arranged to back each other up in the event of molding imperfections.

When used, preferably, the molded seal extends continuously and uninterrupted without gaps around the border frame to provide a full seal, and the seal can comprise a seal projection forming a ring around the border frame and projecting from an outer base surface defined by the border frame an axial or radial distance of between 2 millimeters and 10 millimeters.

The filter cartridge preferably further includes structural support inserts embedded in the side panels.

When used, each structural support insert is preferably embedded in only one of the side panels and spans a length of at least 75% therein.

Preferably, each structural support insert spans not more than 95% of said length.

Advantageously, this arrangement provides sufficient support, ready manufacturability, and may also allow some border frame flexibility for conformance.

In a preferred embodiment, the structural support inserts include support panels formed of wooden material having a thickness in a range of between ⅛ inch and ½ inch.

In one embodiment, the support panels are fully encapsulated in a polymeric material of the side panels. The side panels further include alignment and positioning holes extending to a surface of the support panels. The alignment and positioning holes can be formed in the side panels formed as a result locating pins extending from a mold during molding.

Advantageously, the structural support inserts or support panels can be solid and free of apertures.

In an embodiment, the filter cartridge further includes a headered region in which the headered region has a length and a width greater than a length and a width of the border frame. In such embodiment, the headered region defines two axial faces around the border frame, and the thickness of the headered region defines a radial surface around the border frame. Each axial face may include an axially projecting seal and the radial surface may include a radially projecting seal.

Another inventive aspect relates to a method of making the filter cartridge. The method can include the steps of successively inserting edges of the filter element into molds and successively molding a polymeric material to the edges while inserted therein to separately form the side panels along each of the edges.

The method may be used with a rectangular filter element. The steps of inserting and molding can include inserting a first edge of the filter element into a first mold and molding polymeric material thereto to form a first side panel; removing the filter element from the first mold; inserting a second edge of the filter element into a second mold and molding polymeric material thereto to form a second side panel; removing the filter element from the second mold; inserting a third edge of the filter element into a third mold and molding polymeric material thereto to form a third side panel; removing the filter element from the third mold; inserting a fourth edge of the filter element into a fourth mold and molding polymeric material thereto to form a fourth side panel; and removing the filter element from the fourth mold.

In certain embodiments, the filter element includes a pleated filter media having pleats across one direction of the filter media. In such embodiments, during manufacture, the first edge of the filter element that is dipped in the mold is preferably an edge perpendicular to the pleat direction of the filter media and the second edge and third edge are adjacent to the first edge and parallel to the pleat direction.

During manufacture, the first, second, third and fourth side panels can be overmolded relative to each other.

The method may include structural integrity enhancement by including the steps of forming a portion of a dovetail joint during successive molding of a polymeric material; elevating the portion of the dovetail joint above a bottom of the molding during a subsequent step of the successive molding to allow the polymeric material to flow under and around the portion of the dovetail joint and thereby form a second portion of the dovetail joint, wherein the dovetail joint comprises a tongue and a groove at mold interface seams.

According to a preferred embodiment, the method may further include the steps of allowing the polymeric material to freely expand and embed into the filter media and sealing a selected edge of the filter element.

To provide further structural support, the method can further include the steps of inserting a support panel formed from wooden material in each mold and elevating the support panel from a bottom of the mold during successive molding to encapsulate the support panel in the polymeric material and one of the side panels. The polymeric material can flow around the support panel before being cured.

Manufacture can be accomplished with a mold assembly. The mold assembly can include a mold with first and second mold ends and an intermediate channel section arranged between ends and removably fastened between ends. The mold can define a mold cavity having both end walls and side walls arranged to accommodate the filter element. The filter element can be positioned within 1 inch of the side walls and the end walls during molding to allow molding material to flow around the filter element and form a border frame.

The mold assembly may include a modularity and adjustability feature. In a mold assembly, one may remove and change the intermediate channel section with a different intermediate channel section to accommodate molding of a different size of filter element.

In other aspects, the mold assembly includes a mold having a mold cavity with locating pins arranged in the mold cavity proximate ends of the mold. The locating pins can be arranged to elevate at least one of a support panel insert or an edge of a side panel above a bottom surface of the mold.

According to one embodiment, the mold assembly comprises four molds arranged in a sequence, and the molding of four side panels onto the filter element using the four molds in such sequence can be accomplished.

Another inventive aspect relates to a filter cartridge with multiple support features molded in place. The filter cartridge can include a filter element including a filter media. The filter element can extend between an inlet face and an outlet face, and the filter element can define a periphery surrounding the filter media. The filter cartridge can also include a border frame of polymeric material molded in place to the filter element, and the border frame can define a plurality of sides in surrounding relation of the filter element. A plurality of support panels can be embedded in the border frame.

According to some embodiments, the support panels are formed from a wood material, which has advantageous properties.

The support panels can be fully encapsulated within the polymeric material of the border frame. The polymeric material can define an outer exterior surface facing away from the filter element, and an upstream periphery can be at the inlet face and a downstream periphery can be at the outlet face for the border frame. The sides can be joined at corners, and each support panels can extend at least 75% of a length between corners for a corresponding one of the sides.

Preferably, each support panel extends no greater than 95% of the length.

Preferably, each of the support panels span a width of between 5% and 75% of a width span between the upstream periphery and the downstream periphery and has a thickness in a range of between ⅛ inch and ½ inch.

Another inventive aspect relates to integrally molded seal features of a filter cartridge. The filter cartridge can include a filter element including a filter media. The filter element can extend between an inlet face and an outlet face, and the filter element can define a periphery surrounding the filter media. The filter cartridge can also include a border frame of polymeric material molded in place to the filter element, and the border frame can define a plurality of sides in surrounding relation of the filter element. The filter cartridge can also include a plurality of molded seal members in spaced relation and integrally formed of the polymeric material as part of the border frame, and each molded seal member can be in the form of a seal projection forming a ring around the border frame.

The seal members can include an axial seal and a radial seal in spaced relation from the axial seal. The axial seal can be joined to and project outward from at least one of a molded inlet edge surface and a molded outlet edge surface of the border frame, and the radial seal can project outward from a molded exterior surface of the border frame. The molded exterior surface can extend between the molded inlet edge surface and the molded outlet edge surface.

Additionally, or alternatively, the plurality of molded seal members in spaced relation includes at least one pair of: (i) at least two axial seals and (ii) at least two radial seals. The at least one pair can be arranged to back each other up in the event of molding imperfections.

In a preferred embodiment, the first cartridge includes both a pair of at least two axial seals and a pair of at least two radial seals.

Preferably, the molded seal members extend continuously and uninterrupted without gaps around the border frame to provide a full seal, and the seal comprises a seal projection forming a ring around the border frame and projecting from an outer base surface defined by the border frame an axial or radial distance of between 2 millimeters and 10 millimeters.

While other media packs may be employed, preferably the filter element includes a pleated filter media pack, and the pleated filter media pack includes a plurality of pleats. The pleats can include a plurality of pleat flanks extending between first pleat tips disposed at the inlet face and second pleat tips disposed at the outlet face, and the filter element can comprise a pleat depth of at least 0.75 inches and has first and second spans that are mutually perpendicular and perpendicular to the pleat depth. Each of the first and second spans can extend between 12 inches and 48 inches.

Certain advantages may flow from various aspects discussed above. Such advantages include the prevention of leak paths around or through a filter cartridge as a result of the molded filter frame that creates a full seal around the periphery of a filter element.

Another potential advantage that may be realized through the present invention is that the independently molded side panels of the filter frame in some embodiments prevent gaps between the other side panels of the filter frame.

Still another potential advantage that may be realized through the present invention is a border frame that is able to conform to the shape of a filter housing, thereby substantially eliminating leak paths between the filter cartridge and the filter mounting.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 17B depicts a sectional view of a portion of the headered region of FIG. 17A.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
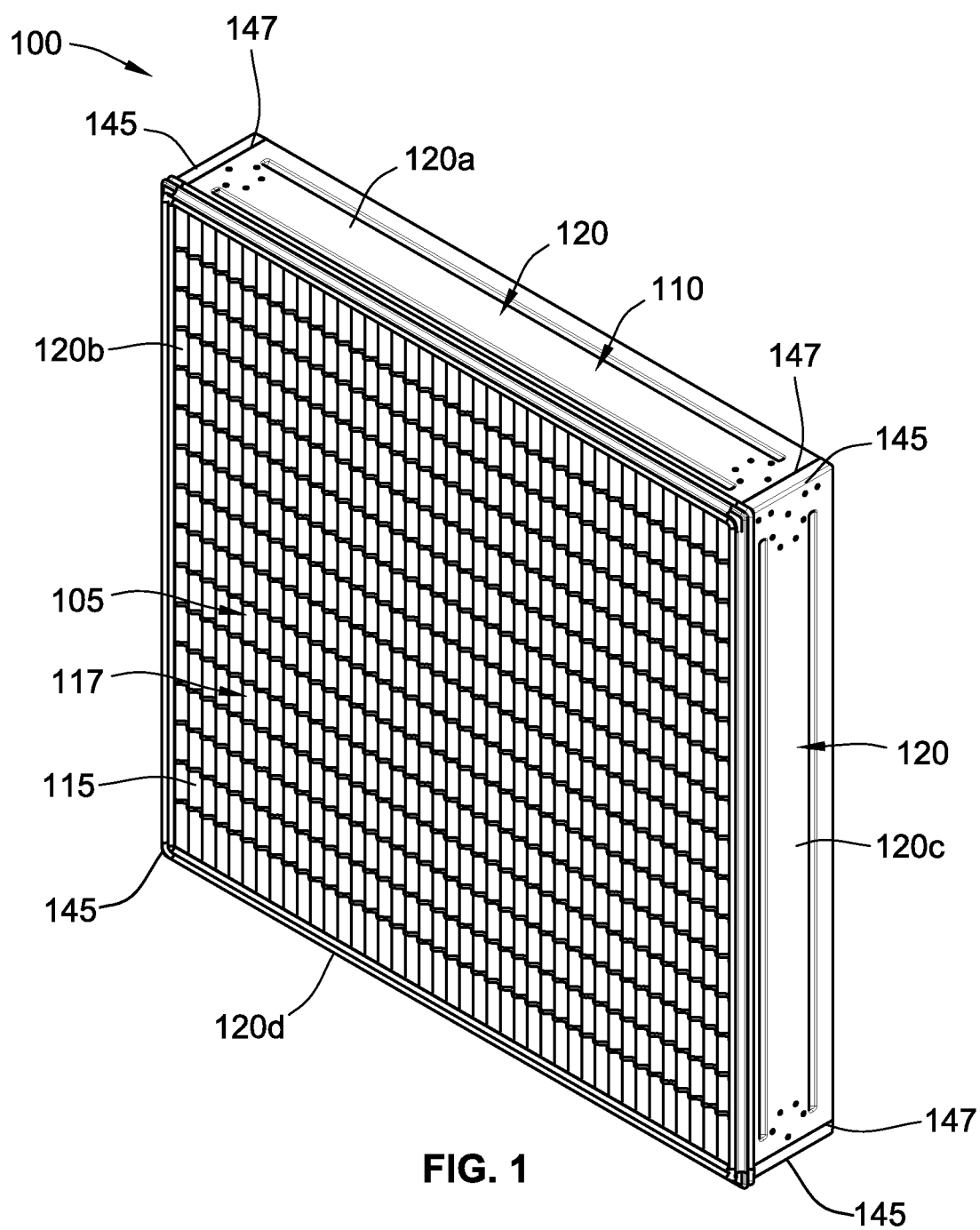
FIG. 1 depicts an isometric view of a filter cartridge according to an exemplary embodiment.

FIG. 1 depicts a filter cartridge 100 according to an exemplary embodiment. The filter cartridge 100 includes a filter element 105 and a border frame 110.

Figure 2A:
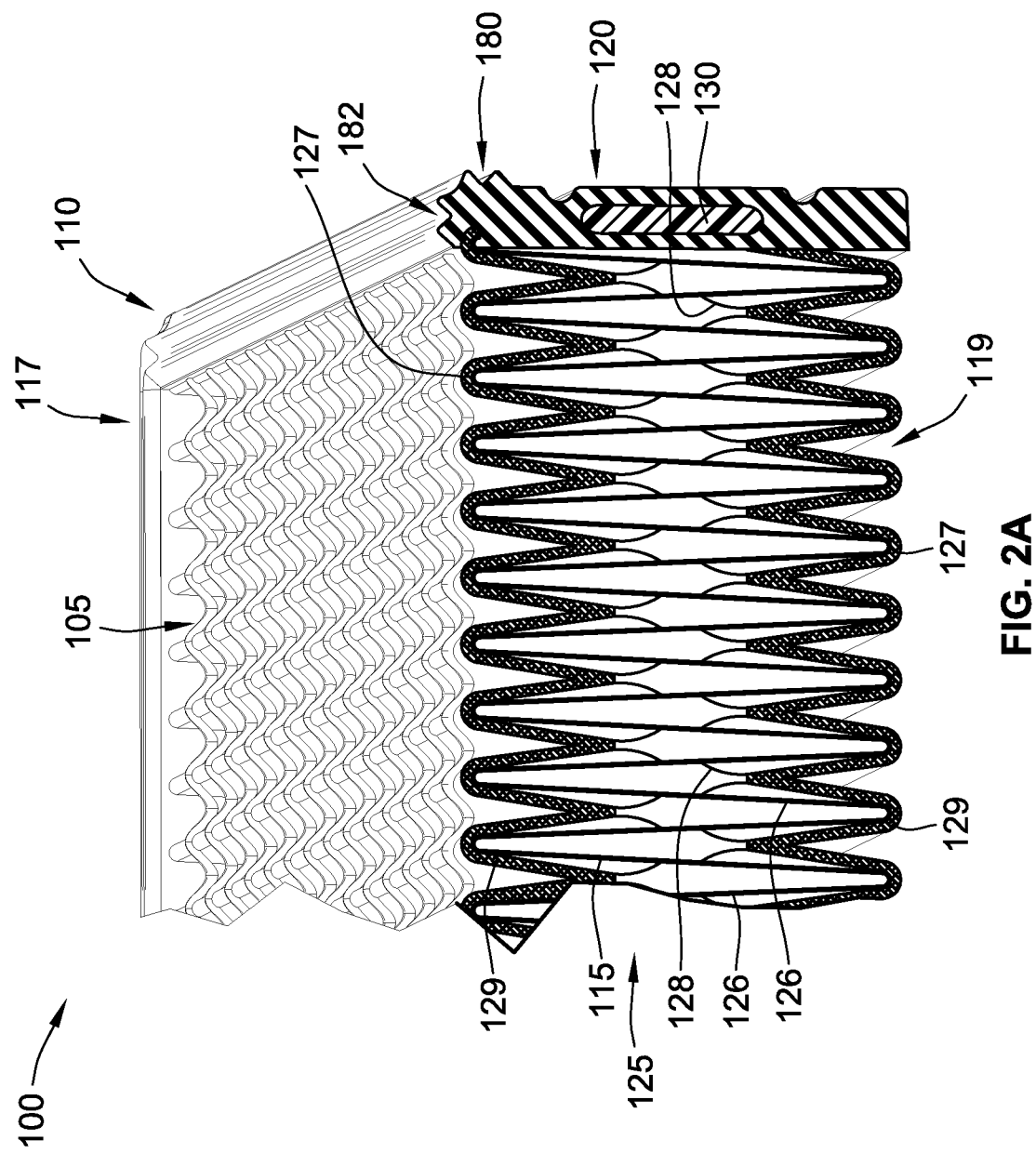
FIG. 2A depicts a partial cross-sectional view of the filter cartridge shown in FIG. 1.

As shown in FIG. 2A, the filter element 105 includes a filter media 115 that extends between an outlet face 117 and an inlet face 119. While described as an outlet face 117 and an inlet face 119, a person having ordinary skill in the art would recognize that the two faces are reversible, i.e., unfiltered air can flow into either face such that filtered air can flow out of the other face. However, for the sake of providing reference, inlet face and outlet face are used herein to describe the embodiments of the filter cartridge depicted in the figures. Further, in a preferred embodiment, the outlet face 119 features the axial seal (as will be discussed in greater detail below) such that the force of incoming air into the filter element 105 causes axial seal on the border frame 110 to compress against the filter housing, enhancing the sealing action.

Returning to FIG. 1, the filter element 105 defines a peripheral extent of the filter media 115, which may be rectangular as shown. The periphery of the filter element 105 is surrounded by the border frame 110, which may also be rectangular. The inlet face 117 of the filter cartridge 100 defines an inlet plane, and the outlet face 119 (as shown in FIG. 2A) of the filter cartridge 100 defines an outlet plane. Preferably, the border frame 110 spans at least the distance between the inlet face 117 and the outlet face 119 such that the border frame 110 is at least coplanar with or extends beyond the inlet plane defined by the inlet face 117 and the outlet plane defined by the outlet face 119.

As shown in FIG. 2A, the filter element 105 is preferably a pleated filter media pack. The pleated filter media pack includes a plurality of pleats 125. Each pleat 125 has a pleat flank 126 extending between a pleat tip 127 of the outlet face 117 and a pleat tip 127 of the inlet face 119.

The pleats 125 typically have a pleat depth (i.e., distance between outlet face 117 and inlet face 119) of between 0.75 and 20 inches. More preferably the pleat depth is between 2 and 6 inches. Additionally, in embodiments, the length and/or width of the filter element 105 is typically greater than 6 inches. More typically, the length and/or width of the filter element 105 is between 12 and 48 inches.

To better facilitate for structural integrity and high air flow, some preferred embodiments may include additional pleat supports and spacers between adjacent pleat flanks 126. For filter elements configured to operate in high-flow-rate environments, spacers, such as plastic finger spacers or hot-melt adhesives spaced at regular intervals, may be placed at regular intervals along the pleated filter media to add structural rigidity and prevent deformation of the media. In addition to being pleated with heat setting of the pleats, the filter media may also be embossed to add structural rigidity, to further increase surface area, and to increase amount of media that can be manipulated into a volume for the filter element 105 and pleats. A method of embossed filter media is described in U.S. Provisional Patent Application No. 62/243,740, filed on Oct. 20, 2015 and titled "Filter Media Packs, Methods of Making and Filter Media Presses" (Attorney Docket No. 510409-PROV2), incorporated in its entirety herein by reference. Another method of embossed filter media is described in U.S. Pat. No. 6,685,833. U.S. Pat. No. 5,290,447, U.S. Pat. No. 5,804,014, and DE 19755466 A1 also describe methods of embossing that, in some embodiments, may be applied to the composite filter media of the present invention. Each of these patents are incorporated by reference in their entireties, as these or other pleating and embossing technologies may be used. U.S. Patent Publication No. 2012/0317940 also depicts embossed filter media that may be useful in certain embodiments of the present invention and is also incorporated in its entirety herein by reference.

Figure 15:
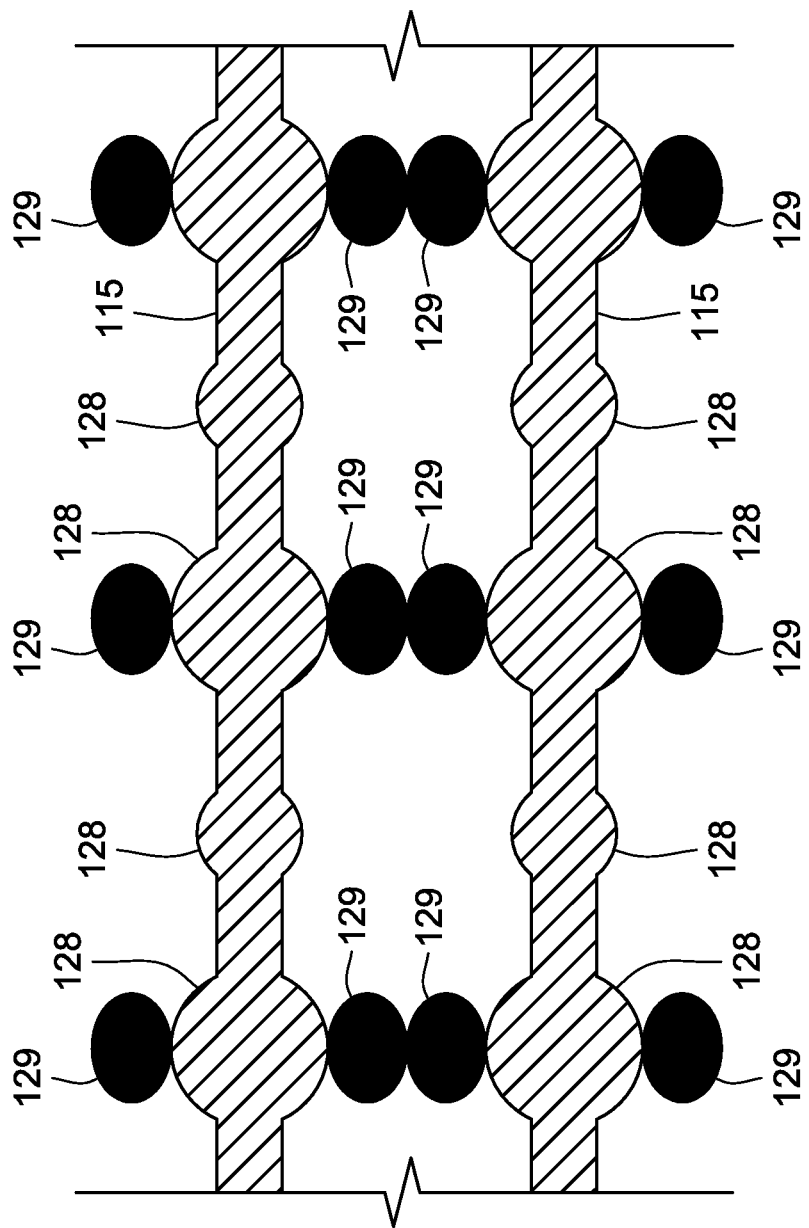
FIG. 15 depicts a partial cross-sectional illustration of filter media embossments of a filter element as shown in FIG. 1.

For example, the filter media 115 can include integrally formed embossments 128 (also shown in FIG. 15), such as grooves, folds or wrinkles, extending between pleat tips 127 and between the inlet face 117 and outlet face 119. Additionally, the filter media 115 can include adhesive spacer beads 129 as shown in FIG. 2A (and also in FIG. 15). Various numbers and arrangements of embossments 128 can be provided. The adhesive beads 129 extend between adjacent pleat tips 127 and along pleat flanks 126 and attach to each other as shown, e.g., in FIG. 2A. This provides consistent pleat spacing and structural integrity to the pleated filter pack. Adjacent pleat tips 127 may be spaced between 0.5 and 2 cm to compact a substantial amount of filter media 115 into the filter element 105 while at the same time keeping an open flow structure to accommodate high air flow capacity. Additionally, the distance between rows of adhesive beads 129 can be between 1 and 5 cm and more preferably is about 3.5 cm.

Figure 2B:
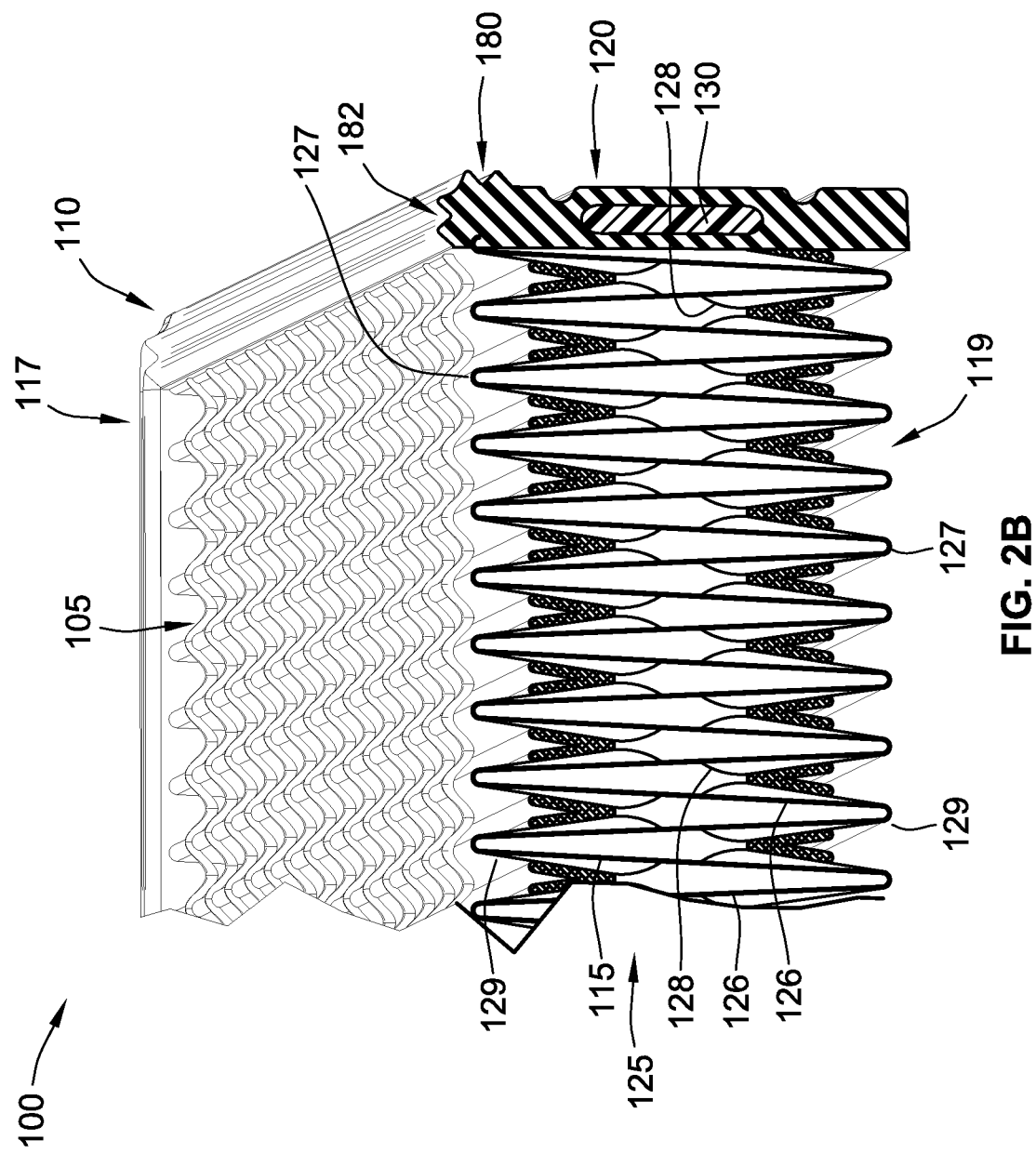
FIG. 2B depicts an alternate embodiment of the filter element of the filter cartridge in which the adhesive spacers are only between pleat flanks.

FIG. 2B depicts an embodiment in which the adhesive beads 129 are contained only between embossments 128 on adjacent pleat flanks 126. In this embodiment, the adhesive beads 129 do not extend continuously over the pleat tips 127. In such embodiments, less adhesive material is used, which decreases the cost of producing the filter element 105.

While a pleated and/or embossed filter media 115 has been described, other filter media configurations can also be utilized. Filter media packs, such as those disclosed in U.S. Publication Nos. 2014/0260139 and 2012/0317940 and U.S. Provisional Patent Application No. 62/243,740 may also be employed in the present invention. These references are hereby incorporated by reference herein.

Preferably, the filter media will have the following properties: a basis weight of between 0.3 and 3.0 ounces/square yard (preferably 0.5 ounces/square yard); an air permeability of between 10 and 500 cfm @ ½ inch of water column pressure (preferably at least 85 cfm @ ½ inch water column pressure), measured according to ASTM D737; and a MERV (Minimum Efficiency Reporting Value) rating of between 5 and 16 according to ASHRAE 52.1.

Additionally, using the axial and radial seals disclosed herein and discussed more fully below as a means of preventing bypass, the filter cartridge 100 may be made HEPA (High-Efficiency Particulate Air) grade according to LEST RP-CC001. In such embodiments, the air permeability is likely to be between 10 and 15 cfm @ ½ inch of water column pressure.

As shown in FIG. 1, the border frame 110 is comprised of a plurality of side panels, referenced generally as side panels 120. In an embodiment, the filter cartridge 100 has a quadrilateral shape such that the border frame 110 is comprised of four side panels, referenced specifically as side panels 120a, 120b, 120c, 120d. The filter cartridge 100 can be a variety of other suitable shapes. In preferred embodiments, the filter cartridge 100 takes a polygonal shape, i.e., a shape having straight sides. In other embodiments, the filter cartridge can have curved sides.

The side panels 120 are preferably independently molded-in-place along the periphery of the filter element 105; that is, each side panel 120 is molded individually such that the entire border frame 110 is not molded to the filter element 105 during a single molding step.

As shown in FIG. 2, the side panels 120 are each molded around a structural support 130. Structural support 130 is optional but preferred to provide support for the otherwise highly flexible pleated panel filter element and quite flexible urethane, or other molding material, border frame.

In an embodiment, the structural support 130 of each side panel 120 has a length l (shown in FIGS. 3A and 3C) that spans at least 75% of the length of each side panel 120. In another embodiment, the length l of each structural support 130 spans not more than 95% of the length of each side panel 120. In a preferred embodiment, the structural support 130 has a length l that is between 2 and 3 inches shorter than the length of each side panel 120. In a preferred embodiment, the structural support 130 has a length l that is 2.375 inches (2⅜") shorter than the length of each side panel 120. In a most preferred embodiment, the structural support 130 has a length l that is 1.75 inches shorter than the length of each side panel 120. The structural supports 130 provide stiffness for the side panels 120, and because the structural supports 130 do not extend the entire length of the side panels 120, the side panels 120 are still able to flex and compress to engage a filter housing and, if necessary, conform to variances.

Figure 3A:
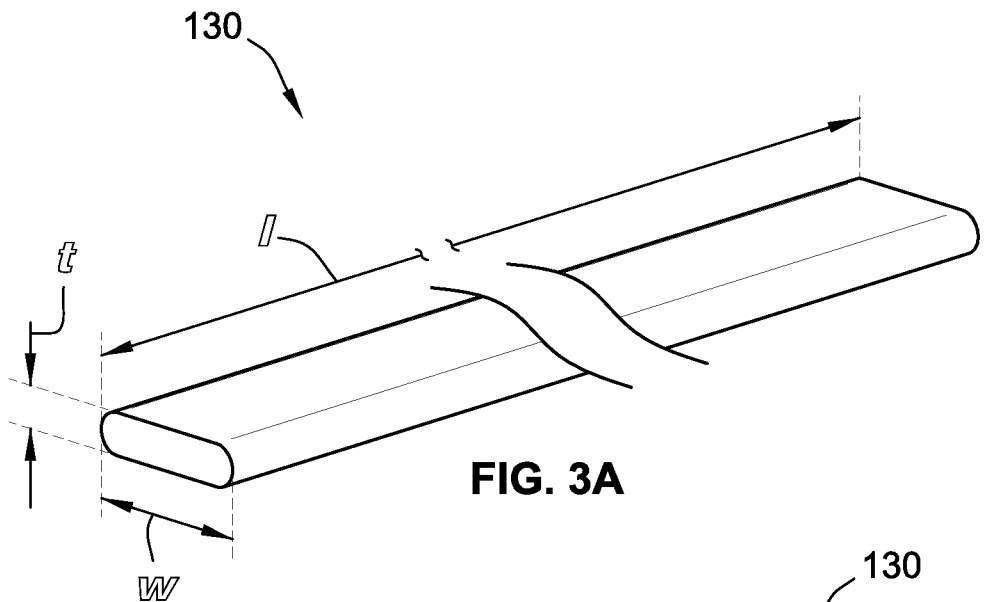
FIGS. 3A-3C depict a structural support insert in the form of a solid wood support panel according to an exemplary embodiment that can be used in the filter cartridge shown in FIGS. 1 and 2.
Figure 3B:
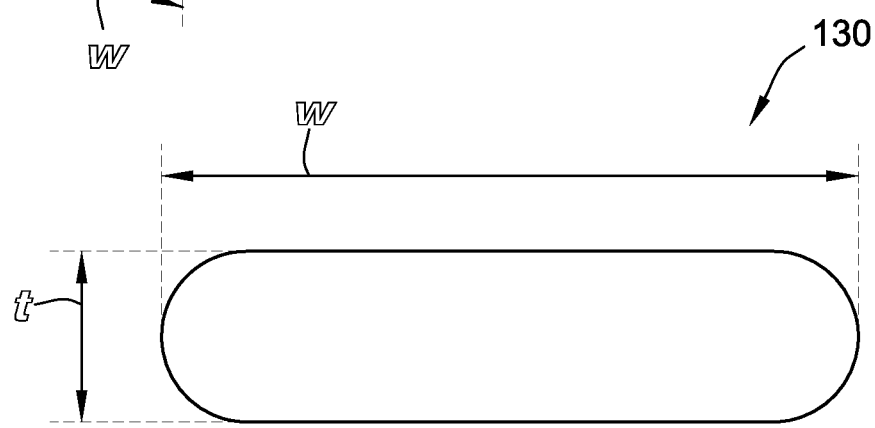
Figure 3C:
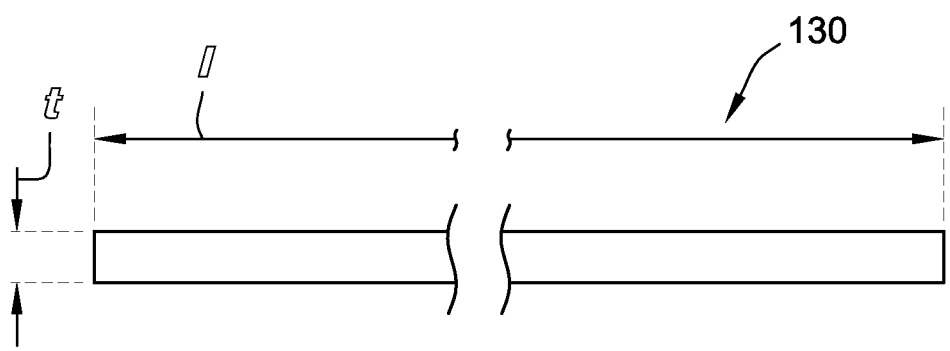

FIGS. 3A-3C show views of an exemplary structural support 130. In an embodiment, the structural supports 130 have a thickness t in a range of between ⅛ inch and ½ inch. In an embodiment, the structural supports 130 have a width w of between 5% and 75% of the width of the side panels 120. In a specific embodiment, the structural supports have a width w of between ¾ and 1½ inches. This can provide support, cost efficiency, and manufacturability features as the molding material can flow around and embed and, most preferably, fully encapsulate the structural support 130.

As depicted in FIGS. 3A-3C, the structural support 130 is solid such that it contains no apertures. However, in other embodiments, the structural support can be hollow, contain apertures or indentations, and/or have a varying width and/or thickness along its length. Such features serve to reduce the weight of the structural support while still providing the necessary structure to maintain the straightness of the side panels 120.

In further an embodiment, the structural supports 130 of the filter cartridge 100 do not contain metal or plastic. In a specific embodiment, the structural support is made of wood. Wood is a preferred material for the structural support because wood will not warp from the heat of the molding process (described below). Thus, the wood maintains straightness and limits the flexibility of frame along the sides panels. In a preferred embodiment, the structural support is poplar wood. In other embodiments, composites or plywood can alternatively be used. Advantageously, the filter cartridge containing a wooden structural support is fully able to be incinerated. Also, wood is receptive to the uncured molding material, allowing it to readily flow around the wooden structural support 130.

In other embodiments, the filter element 105 features an internal structural support 130. For instance, in a pleated filter media having an inlet/outlet face with a width and/or length dimension greater than 20 inches, a structural support 130 can be included in a parallel arrangement between one or more pleats 125 of the filter element 105. Preferably, the structural support 130 has a length that is only slightly shorter than the distance between opposing side panels perpendicular to the pleat direction. The structural support 130 can be made from the same or a different material than the structural supports 130 in the side panels 120. For instance, the structural support can be a wood, metal, or plastic material.

Figure 4:
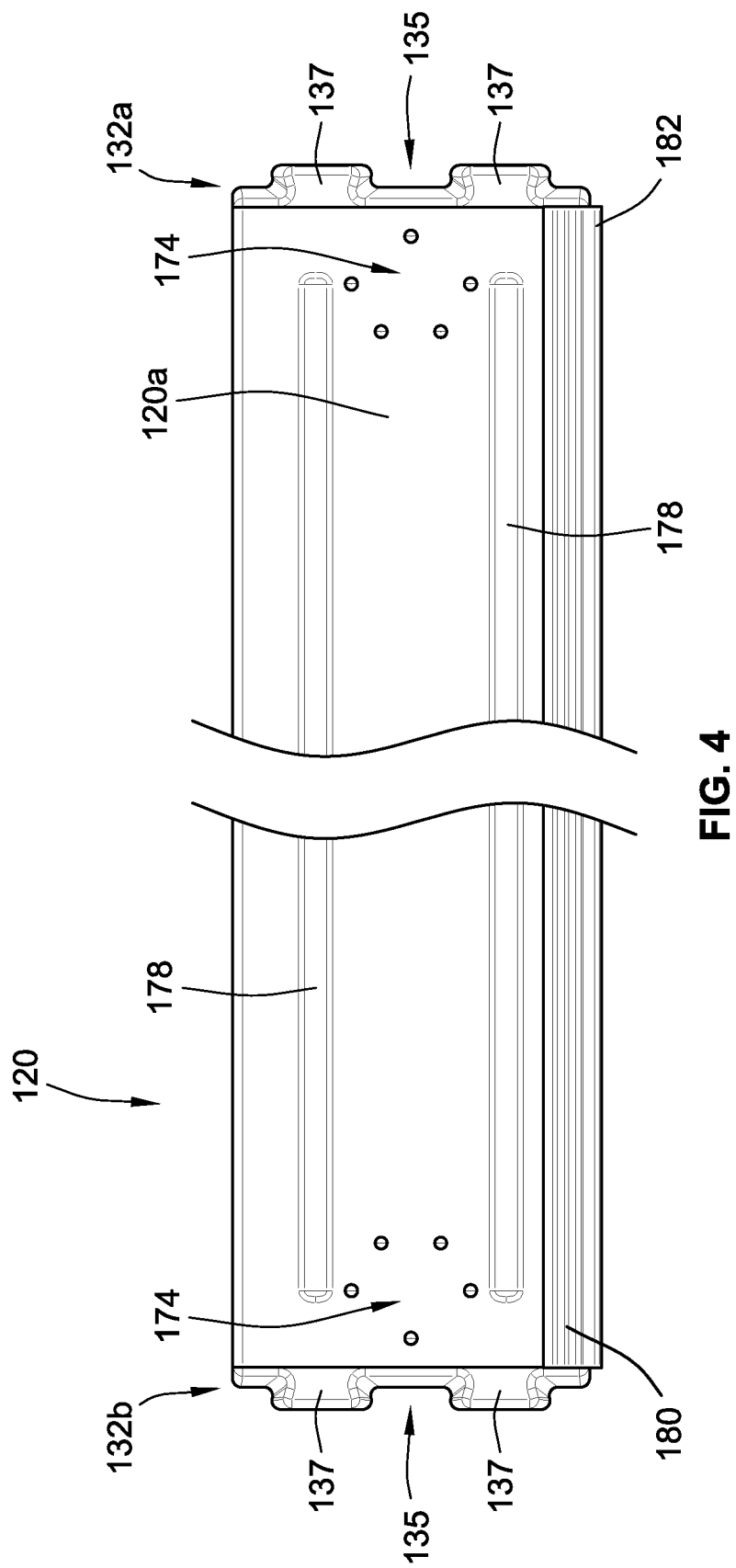
FIG. 4 depicts a molded side panel used in the filter cartridge of FIGS. 1 and 2.

FIG. 4 shows an exemplary side panel 120a. As can be seen in FIG. 3, the side panel 120a has a first end 132a and a second end 132b. Each end 132a, 132b is non-linear such that each end 132a, 132b includes a mold interface 135 that forms a geometric and mechanical interlock between adjacent side panels 120. In the embodiment depicted, the mold interface 135 includes a dovetail projection 137 (e.g., for forming a tongue and groove joint); however, other geometric shapes can be used as part of the mold interface 135, such as cylindrical or prismatic pin shapes, tenon shape, or mushroom head shape.

Figure 5:
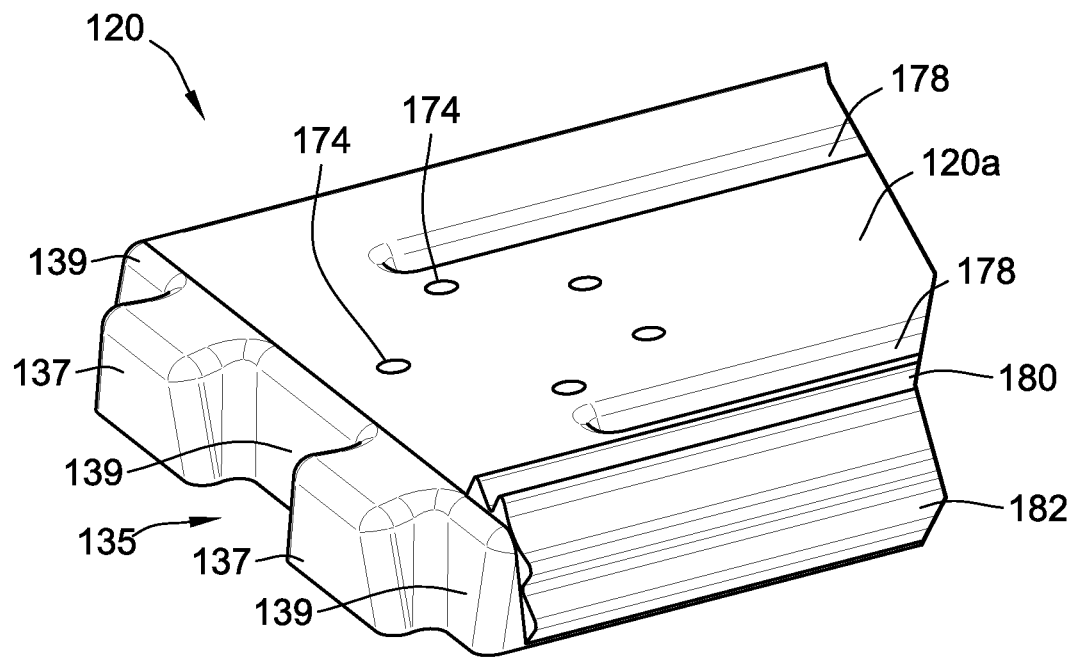
FIG. 5 depicts an isometric view of a molded interface of the side panel shown in FIG. 4.
Figure 6:
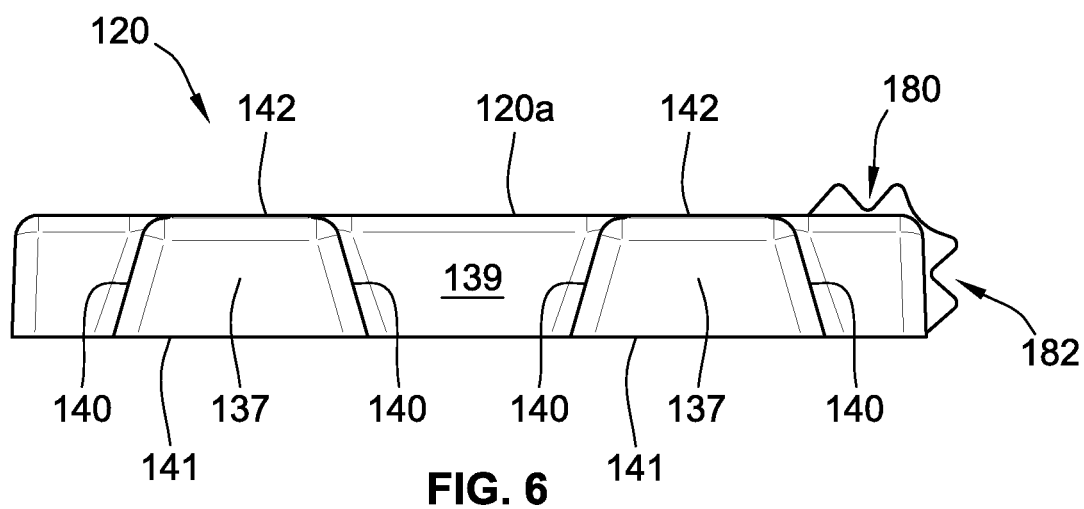
FIG. 6 depicts a plan view of the molded interface shown in FIG. 4.

FIGS. 5 and 6 show detail views of the mold interface 135. As shown in FIG. 5, the mold interface 135 has a multi-faceted surface, preferably such that angles are created in all three coordinate planes. Thus, with reference to FIG. 5, an edge wall 139 has an incline between the top and bottom surface of the side panel 120*a*. Additionally, as shown best in FIG. 6, the dovetail projection 137 has tapering sidewalls 140, such that a base 141 of the dovetail projection 127 is wider than the top surface 142 of the dovetail projection 137. However, the dovetail projection 137 can taper in the opposite direction, i.e., the top surface 142 being wider than the base 141, or the dovetail projection 137 can also not feature a tapering sidewall 140. These angled, multi-faceted surfaces help to strengthen the joint between adjacent side panels 120 of the border frame 110 by providing interlocking in all three coordinate planes during molding as will be discussed below.

Figure 7:
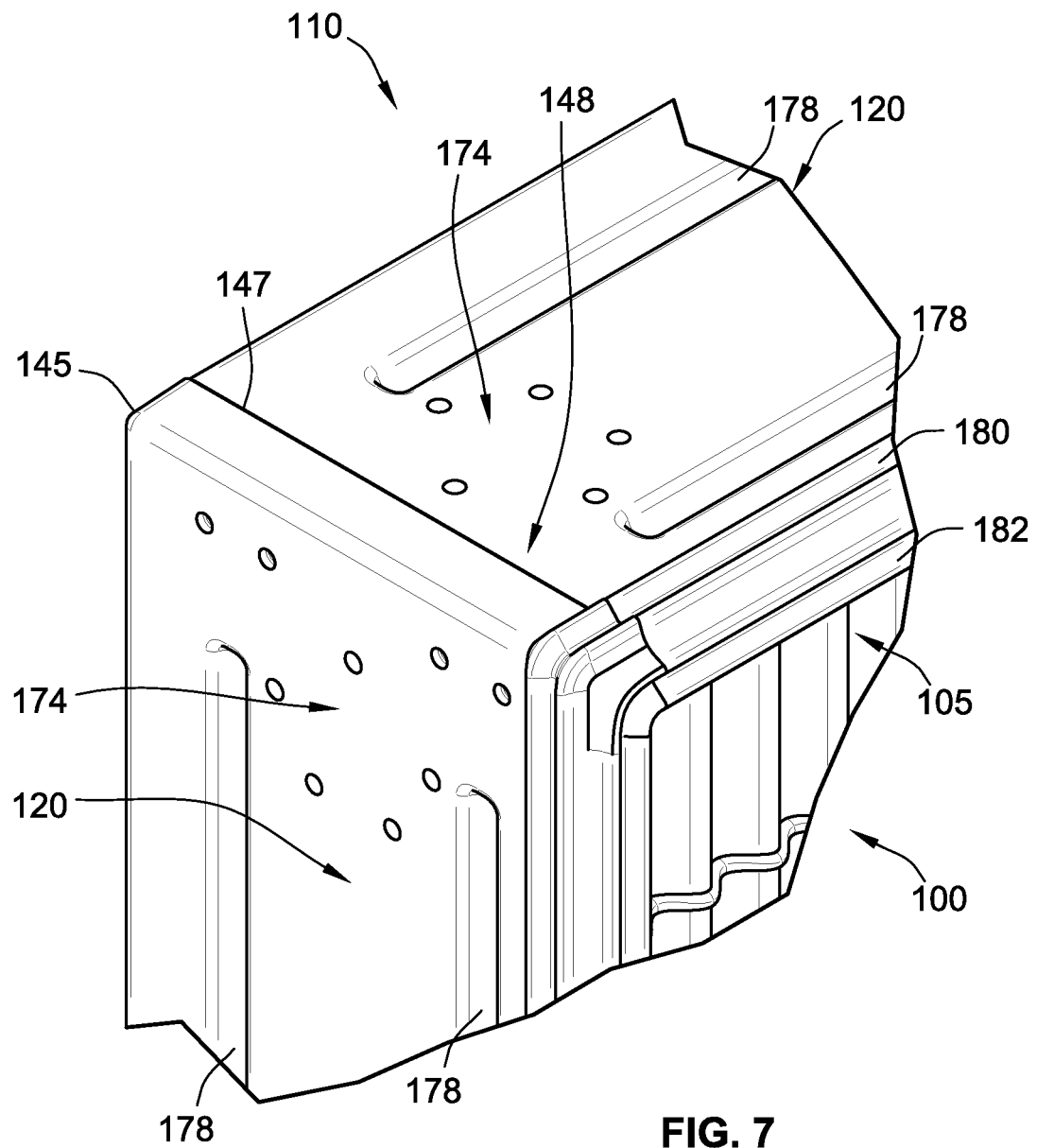
FIG. 7 depicts an isometric view of a molded corner of a border frame of the filter cartridge shown in FIG. 1.

FIG. 7 shows a molded corner 145 of the border frame 110. As can be seen, the molding of adjacent side panels 120 produces a mold interface seam 147. In the embodiment depicted in FIG. 1, the filter cartridge 100 is rectangular with four molded corners 145, and thus, four mold interface seams 147 are provided about the border frame 110. Each mold interface seam 147 is proximate to one of the four molded corners 145. In a preferred embodiment, the mold interface seam 147 is within two inches of the molded corner 145.

A surface step 148 can develop at the location of the mold interface seam 147, possibly with some molding material flash at this location. Typically, this surface step 148 between adjacent side panels 120 will be between 1 micron and 1 millimeter across the seam 147. Preferably, the side panels 120 on either side of each mold interface seam 147 are level with each other such that the mold interface seam 147 is a flush surface. Thus, the most preferred surface step 148 is 0. However, to the extent a surface step 148 is created, preferably, the surface step 148 is less than 0.5 millimeter, and most preferably, the surface step 148 is less than 0.2 millimeter.

Figure 8:
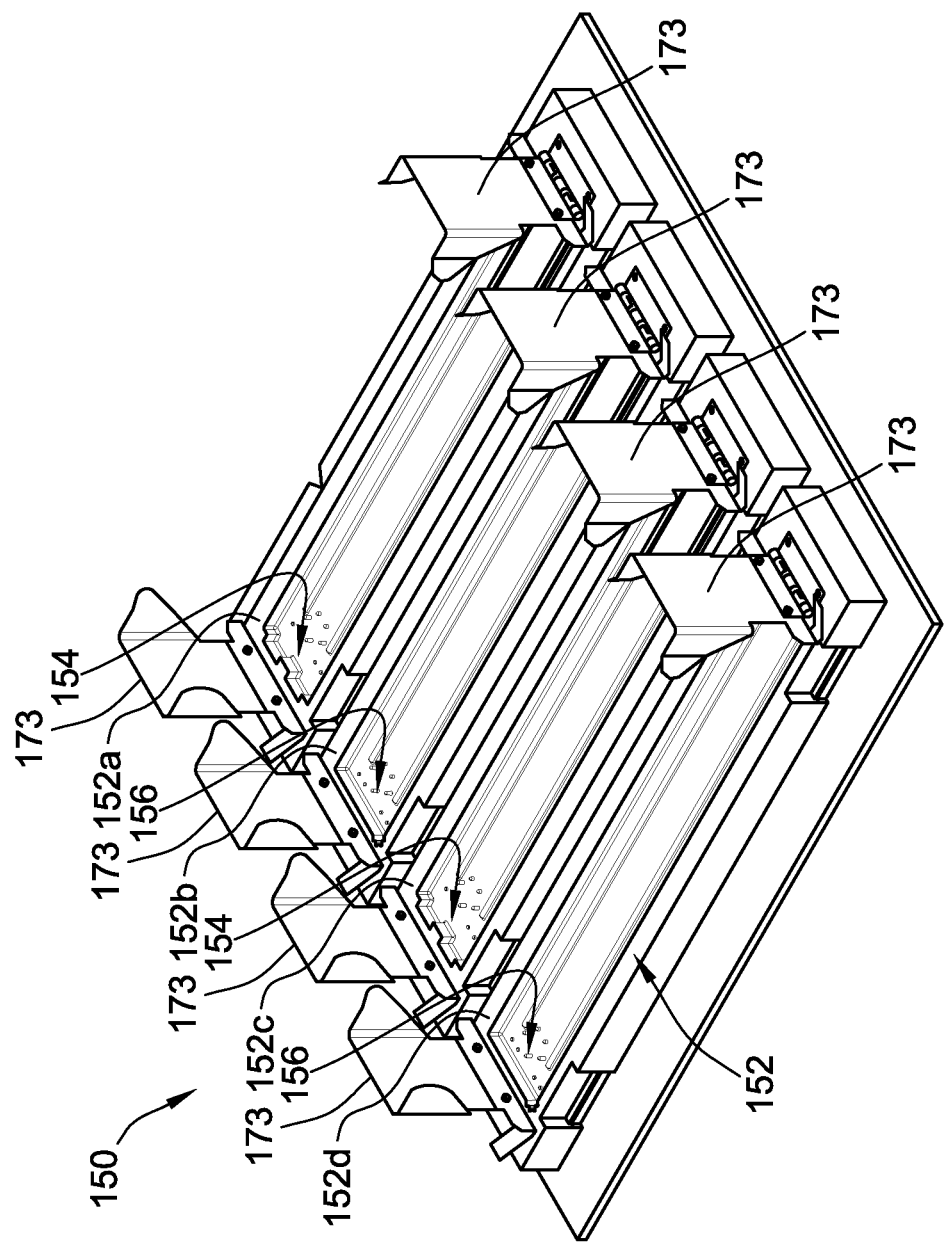
FIG. 8 depicts an isometric view of a mold assembly according to an exemplary embodiment that can be sued to make the filter cartridge shown in FIG. 1.

The surface seam 147 has the potential to result from the molding process because the side panels 120 are molded independently. FIG. 8 shows an exemplary mold assembly 150 for forming the side panels 120. The mold assembly 150 contains a separate mold, referenced generally as mold 152, for each side panel 120 of the border frame 110. Each side of the filter element 105 is dipped into the mold 152 such that a side panel 120 can be formed on the filter element 105.

Each side panel 120*a*, 120*b*, 120*c*, 120*d* (as shown in FIG. 1) has a separate mold, referenced specifically as molds 152*a*, 152*b*, 152*c*, 152*d* as shown in FIG. 8. The first mold 152*a* provides two mold interface impressions 154 for two mold interfaces 135 on each end 132*a*, 132*b* of the first side panel 120*a*. The second mold 152*b* and third mold 152*c* each provide one mold interface impression 154 and a square impression 156 for the second side panel 120*b* and the third side panel 120*c*. The fourth mold 152*d* provides two square impressions 156 for the fourth side panel 120*d*.

Figure 9:
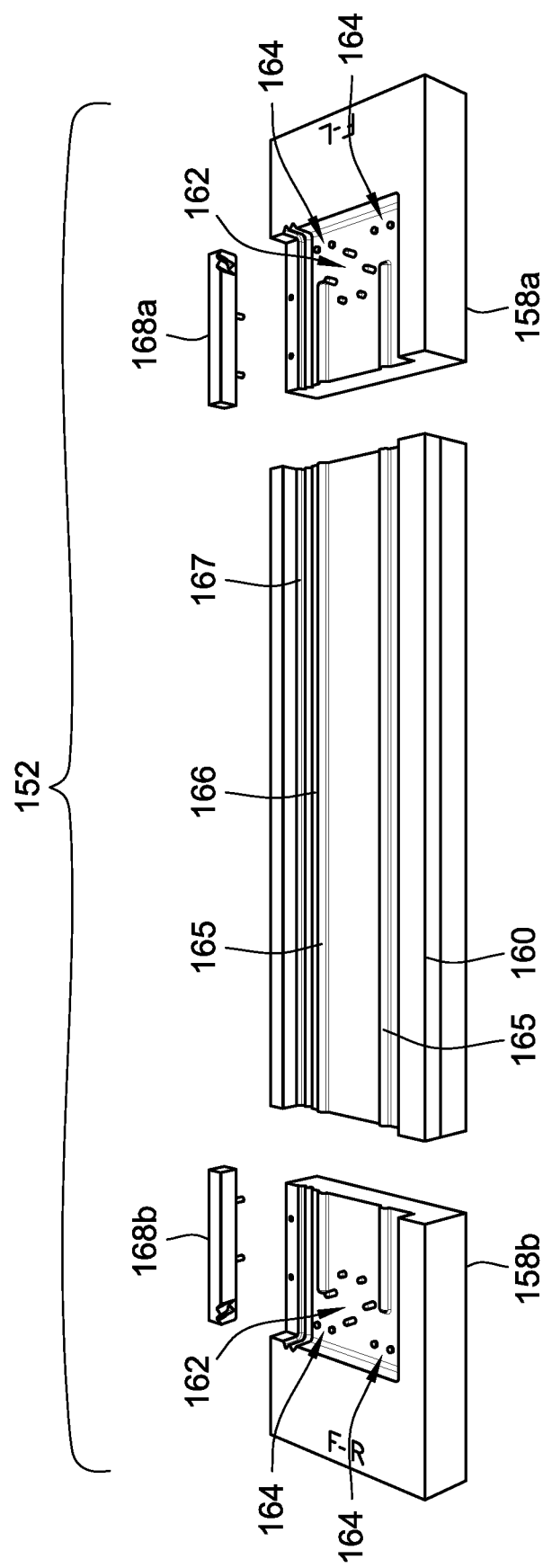
FIG. 9 depicts an exploded isometric assembly view of a single mold of the mold assembly shown in FIG. 8.

While the ends of each mold 152 may provide different impressions for the ends 132*a*, 132*b* of each side panel 120 (e.g., shown in FIG. 4), the molds 152 all feature several similar structures. As shown in FIG. 9, each mold is preferably made from two mold ends 158*a*, 158*b* and an intermediate channel section 160. The mold ends 158*a*, 158*b* are selectively attachable to the intermediate channel section 160 such that different lengths of intermediate channel sections 160 can be inserted between the mold ends 158*a*, 158*b* to accommodate a variety of filter element 105 sizes (e.g., lengths between 6 inches and 48 inches to provide a plurality of different filter cartridge sizes). For example, the mold ends could make a 2 foot by 2 foot filter cartridge, a 1 foot by 28 inch filter cartridge, a 1 foot by 1 foot filter cartridge, or other sizes as desired. In this way, the intermediate channel sections 160 can be extruded pieces, which are relatively less expensive to produce than the machined mold ends 158*a*, 158*b*.

Figure 10:
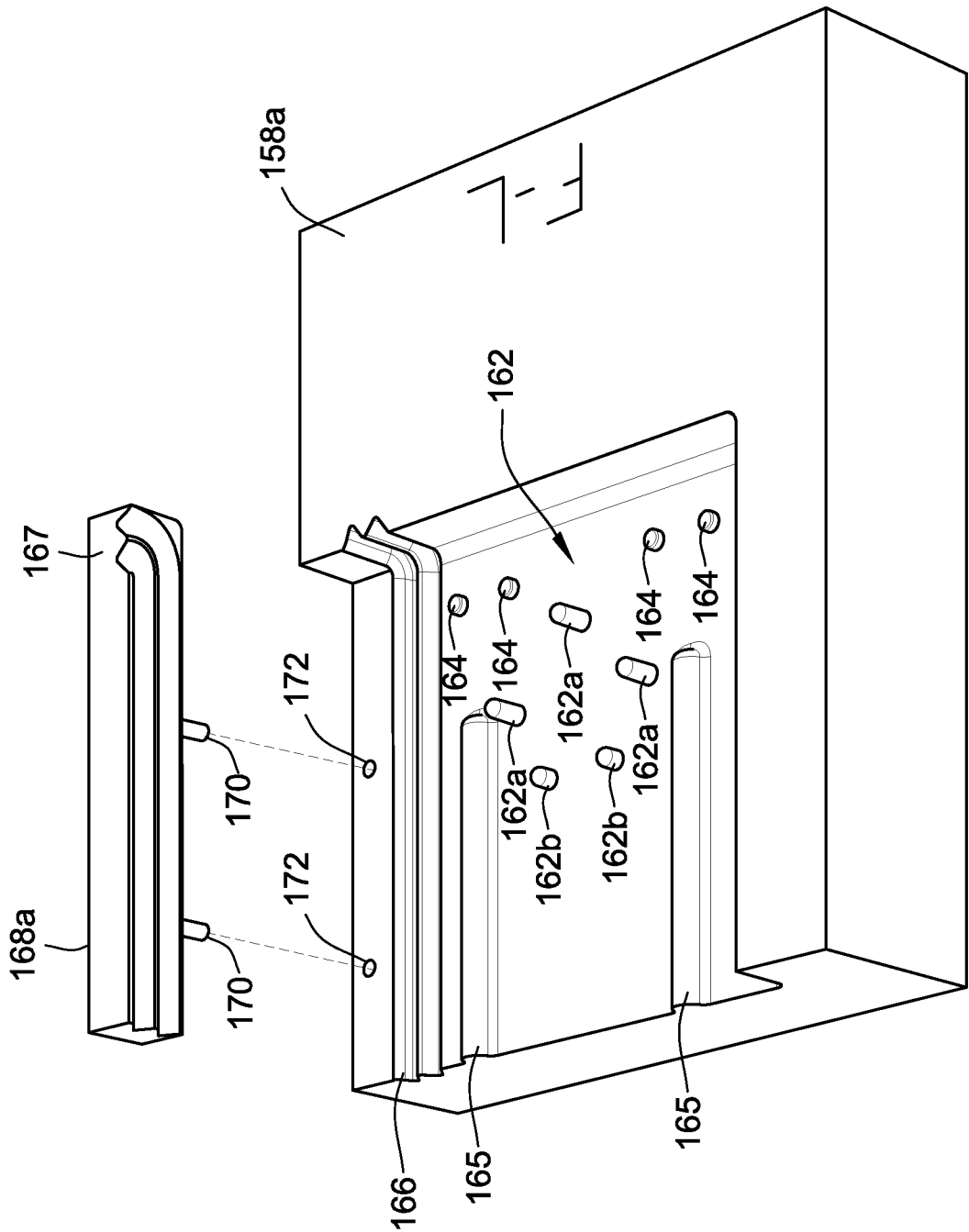
FIG. 10 depicts an exploded isometric view of a mold end of the mold shown in FIG. 9.

A detail view of a mold end 158*a* is provided in FIG. 10. The mold end 158*a* includes a set of locating pins 162 for positioning the structural support 130 within the side panel 120. As shown in FIG. 10, the locating pins 162 have two heights. The first locating pins 162*a*, which are relatively taller, position the structural support 130 in the horizontal plane defined by the width and length of the side panel 120. Thus, the first locating pins 162 ensure that the structural support 130 is substantially centered along the length and width of the side panel 120 and that the structural support 130 does not migrate too far to either end 132*a*, 132*b* of the side panel 120. The second locating pins 162*b*, which are relatively shorter, define the vertical position of the structural support 130 within the thickness of the side panel 120.

As also shown in FIG. 10, the mold end 158*a* includes a series of end pins 164. The end pins 164 are designed to contact the dovetail projections 137 of the mold interface 135 (as shown, e.g., in FIG. 5) so as to allow the molding material to fully encompass and interlock with all sides of the dovetail projections 137 of the mold interface 135. This also helps to ensure a smooth surface throughout the corner region 145 of the filter cartridge 100 (as shown, e.g., in FIG. 7), i.e., to ensure that the dovetail projections 137 do not extend past the surface of the adjacent side panel 120.

Returning to FIG. 9, the mold ends 158*a*, 158*b* and intermediate channel section 160 together define two ridges 165 that extend along a substantial portion of the length of the mold 152. Together, the mold ends 158*a*, 158*b* and the intermediate channel section 160 also define a first double channel 166 along the interior, bottom surface of the mold 152 and a second double channel 167 along the wall surface of the mold 152. Thus, the first double channel 166 extends along a plane that is perpendicular to a plane along which the second double channel 167 extends.

The mold ends 158*a*, 158*b* and the intermediate channel section 160 can be assembled together in a variety of ways. As shown in FIG. 9, assembly of the mold ends 158*a*, 158*b* and the intermediate channel section 160 is facilitated with the use of removable sidewall sections 168*a*, 168*b* that detach from the mold ends 158*a*, 158*b*. As can be seen in FIG. 10, the removable sidewall section 168*a* has attachment pins 170 that correspond to attachment holes 172 located in the mold ends 158*a*. Also, as shown in FIG. 10, the second double channel 166 extends along the removable sidewall section 158*a*, which turns upward at the end of the removable sidewall section 158*a*. As will be discussed below, this bending of the second double channel 166 ensures that a continuous axial seal is created around the periphery of the border frame 100.

Figure 11A:
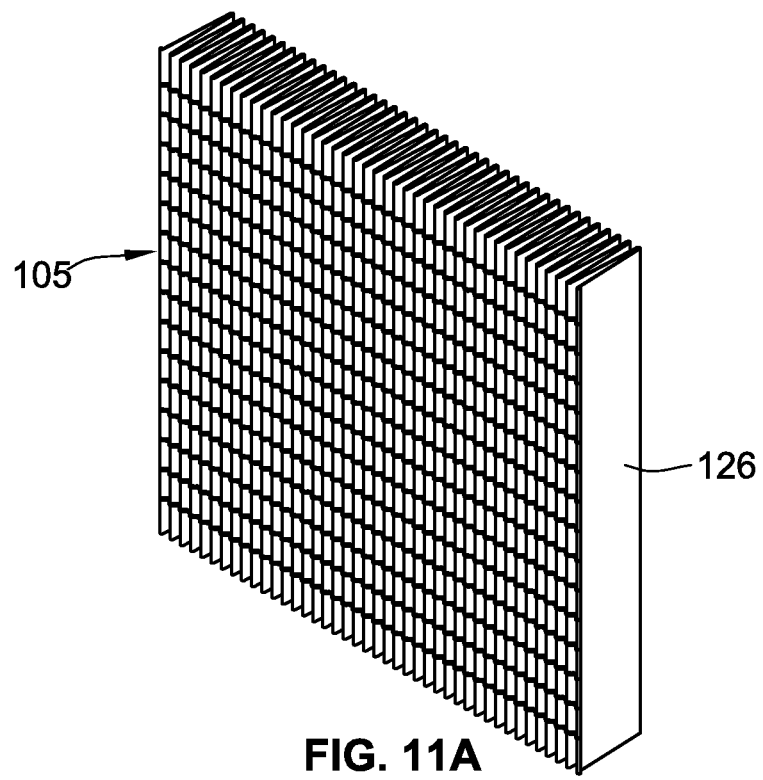
FIGS. 11A-D depict isometric views of the filter element at various stages of molding according to an exemplary embodiment to form the filter cartridge shown in FIG. 1 and using the mold assembly shown in FIG. 8.
Figure 11B:
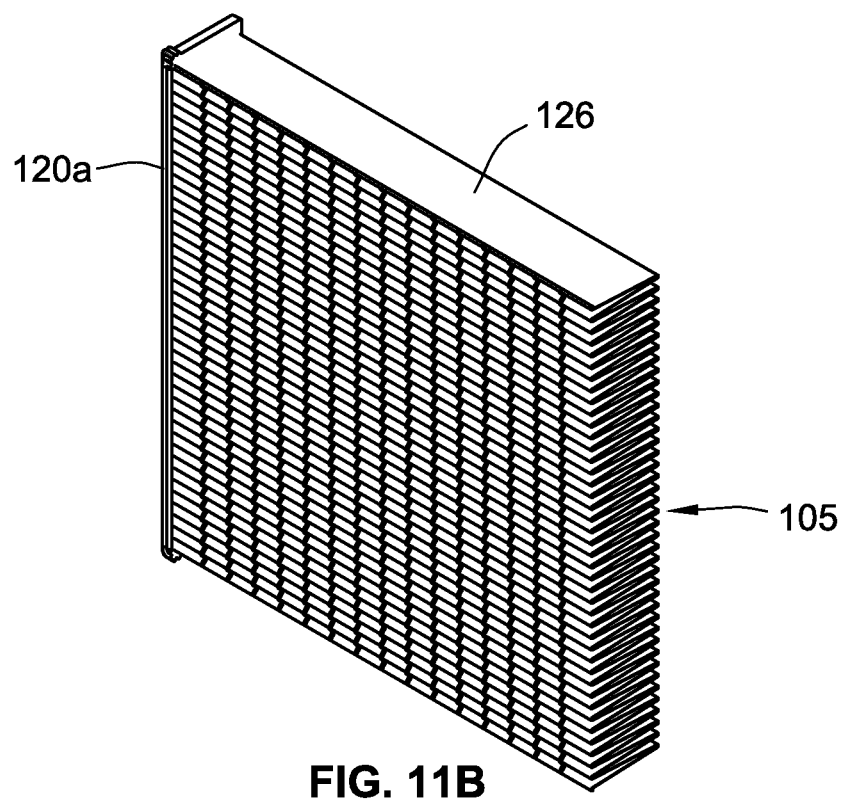
Figure 11C:
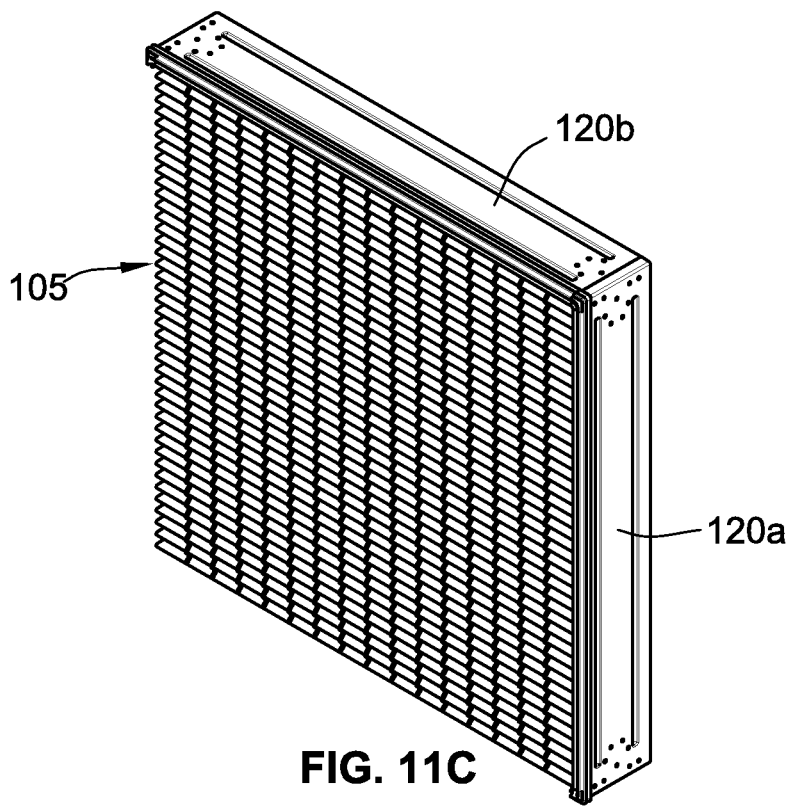

Having described the filter cartridge 100 and the mold assembly 150, the molding process will now be described. The process begins with an unmolded filter element 105 as shown in FIG. 11A. As shown in FIG. 11A, the unmolded filter element 105 has been embossed, pleated, and provided with adhesive spacer beads. In a first step of the molding process, the first mold 152*a* of FIG. 8 is charged with a viscous, liquid molding material, and then a first side of the filter element 105 is dipped into molding material contained in the first mold 152*a* to form the first side panel 120*a* as shown in FIG. 11B. Inserting the filter element 105 into the first mold 152a a can be facilitated through the use of guides 173 (depicted in FIG. 8) to ensure proper positioning of the filter element 105 within the mold 152a; similar guides 173 are provided on the other molds 152b, 152c, 152d. If the filter element 105 is square or another equilateral shape, then the exact side of the filter element 105 that is dipped into the mold 152a is immaterial. For other filter element geometries, the relative lengths of the sides of the filter element 105 will dictate which side is dipped into the first mold 152a based on the length of the first mold 152a.

As depicted in FIG. 11B, preferably, the first side panel 120a is formed on a side of the filter element 105 perpendicular to the pleat direction. Because the filter element 105 is pleated, the width of the filter element is variable because the pleats can expand or contract, like an accordion. By dipping a side perpendicular to the pleat direction first followed by the two adjacent sides as discussed below (which are parallel to the pleat direction), the dimensions of the filter can be fixed such that the corners are square and the surface step is minimized or eliminated. The guides 173 help to ensure that the filter element 105 is the proper width when entering each mold 152. Further, the filter element 105 is preferably made slightly larger than the intended final dimensions such that the pleats are compressed when the filter element 105 is inserted into each mold 152.

The filter element 105 is left in the mold 152a for a time sufficient for the molding material to solidify. In various embodiments, the side panels 120 are made of a molded polymeric material, such as polyurethane, urethane, plastisol, silicone, synthetic rubber, and/or natural rubber. In an embodiment, the polymeric material has a Shore00 durometer of between 20 and 70. In a preferred embodiment, the polymeric material is urethane foam, which depending on side panel thickness and environmental factors (such as humidity) has a curing time of approximately 8 minutes. Typical curing times for the disclosed materials can vary between about 5 and 10 minutes.

As discussed, the first mold 152a creates a mold interface 135 on each end 132a, 132b of the first side panel 120a. FIG. 11B depicts the filter element 105 with the first molded side panel 120a, which in this case was formed on a side transverse to the pleat flanks 126.

The second side panel 120b and the third side panel 120c are then formed in the second mold 152b and the third mold 152c, respectively. In this instance, the second side panel 120b and the third side panel 120c are formed on the sides of the filter element 105 parallel to the pleat flanks 126. After charging the second mold 152b with molding material, the filter element 105 is inserted into the second mold 152b in such a way that the molded interface 135, including the dovetail projections 127, on the first end 132a of the first side panel 120a is located on the square impression 156 end of the second mold 152b. In this way, the viscous molding material flows under and around the dovetail projections 127 and the molded interface 135 at the first end 132a of the first side panel 120a, and when the molding material cures, an interlocking molded interface 135 will form at an end of the second side panel 120b. At the other end of the second side panel 120b, a new molded interface 135 is molded for interlocking with the fourth side panel 120d. FIG. 12C depicts the filter element 105 with the first side panel 120a and the second side panel 120b formed on two sides of the filter element 105.

Figure 11D:
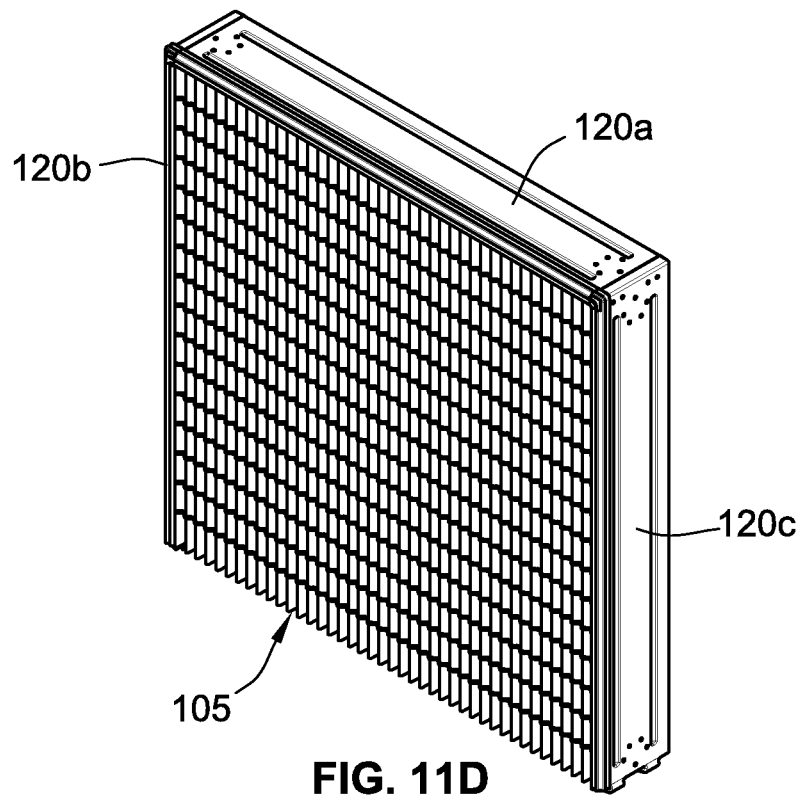

After forming the second side panel 120b, the third mold 152c is charged with molding material. The filter element 105 is then inserted into the third mold 152c in such a way that the molded interface 135, including the dovetail projections 127, on the second side 132b of the first side panel 120a is located on the square impression 156 end of the third mold 152c. In this way, the viscous molding material flows under and around the dovetail projections 127 and the molded interface 135 at the second end 132b of the first side panel 120a, and when the molding material cures, an interlocking molded interface 135 will form at an end of the third side panel 120c. At the other end of the third side panel 120c, a new molded interface 135 is molded for interlocking with the fourth side panel 120d. FIG. 11D depicts the filter element 105 with the first side panel 120a, the second side panel 120b, and the third side panel 120c formed on three sides of the filter element 105.

Having formed the second side panel 120b and the third side panel 120c on opposite sides of the filter element 105 will cause two molded interfaces 135, each with two dovetail projections 127, to extend past the remaining unmolded side of the filter element 105. Thus, as discussed above, the fourth mold 152d has square impressions 156 on both mold ends 158a, 158b. The fourth mold 152d is charged with molding material, and the filter element 105 is inserted into the fourth mold 152d. The viscous molding material flows under and around the dovetail projections 127 and the molded interfaces 135 on the second side panel 120b and the third side panel 120c. When the molding material cures, an interlocking molded interface 135 will form at both ends of the fourth side panel 120d, and the filter cartridge 100 is complete as shown in FIG. 1.

Directly molding the side panels 120 around the filter element 105 ensures that a seal is created around the filter element 105 between the filter element 105 and the border frame 110 because the filter media 115 is embedded in the border frame 110. The material and side panels can overmold upon each other and overmold the corners of the filter media to prevent leakage in this fashion. Advantageously, the need for a secondary adhesive or potting agent to prevent air bypass can be eliminated, if desired.

Figure 14:
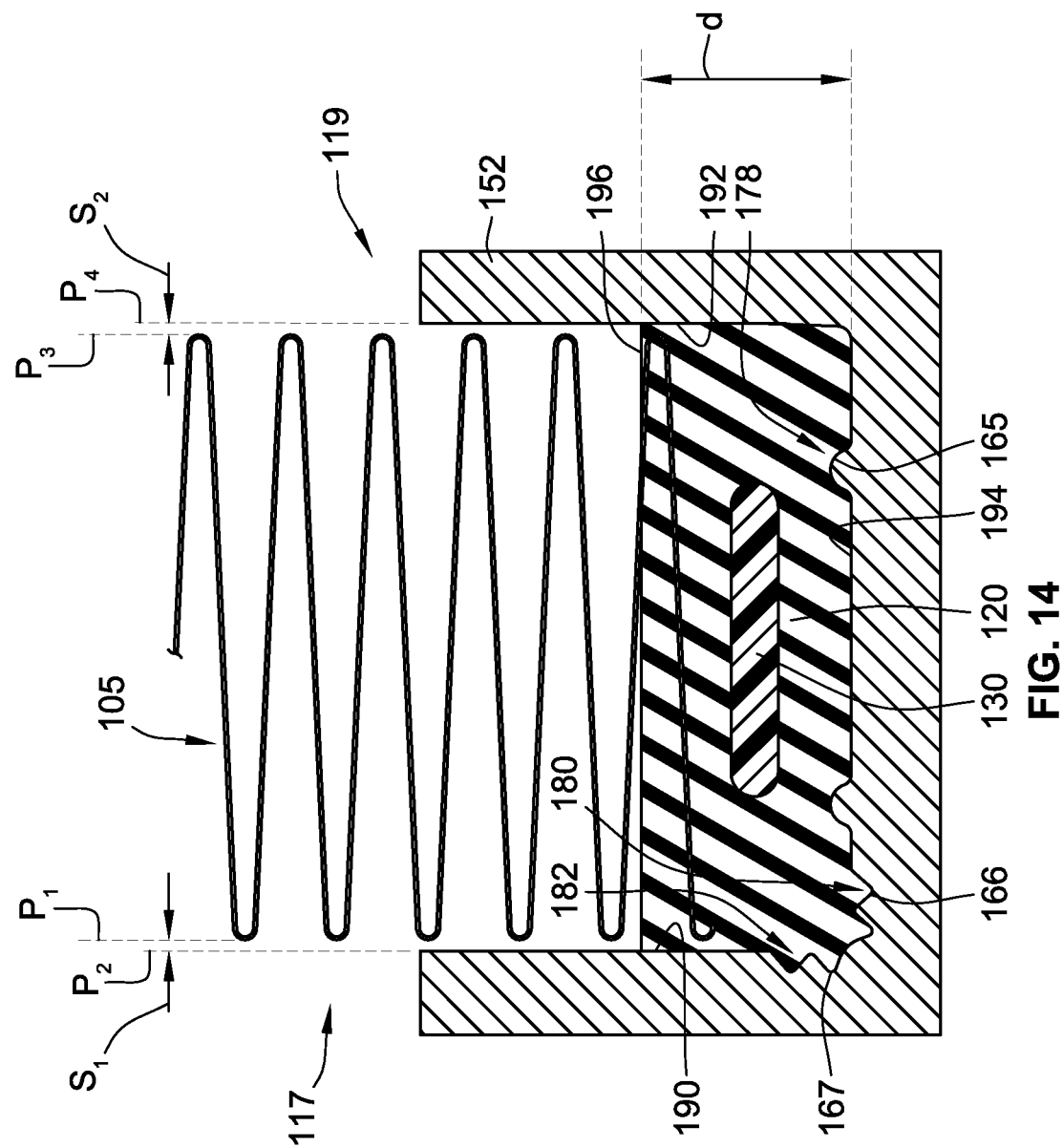
FIG. 14 depicts a partial cross-sectional illustration of a filter element as shown in FIG. 11A as inserted into a mold as shown in FIG. 8.

FIG. 14 depicts the filter element 105 inserted into a mold 152. As can be seen, the molded side panel 120 preferably extends past the outlet face 117 and past the inlet face 119. Thus, a plane $P_1$ defined by the outlet face 117 is spatially disposed a distance $s_1$ from a plane $P_2$ defined by a molded inlet edge surface 190 of the side panel 120. Similarly, a plane $P_3$ defined by the inlet face 119 is spatially disposed a distance $s_2$ from a plane $P_4$ defined by a molded outlet edge surface 192 of the side panel 120. The distance $s_1$ and the distance $s_2$ can be the same or different. Preferably, the distances $s_1$, $s_2$ are between 0 inches and 1 inch. Positioning the filter element 105 into the mold 152 to establish the proper distances $s_1$, $s_2$ can be facilitated with the guides 173 (as shown in FIG. 8).

Also shown in FIG. 14, an exterior surface 194 of the side panel 120, which faces away from the filter element 105, is formed against the cavity of the mold 152. The side panel 120 also has an irregular expanded surface 196 into which the filter element 105 is embedded and sealed. The molded exterior surface 194 extends between and connects between the molded inlet edge surface 192 and the molded outlet edge surface 190. The side panel 120 defines an average depth d between the molded exterior surface 194 and the irregular expanded surface 196 of between ⅛ inch and 2 inches. More preferably, the depth d is between ¾ inches and 1½ inches.

Figure 12:
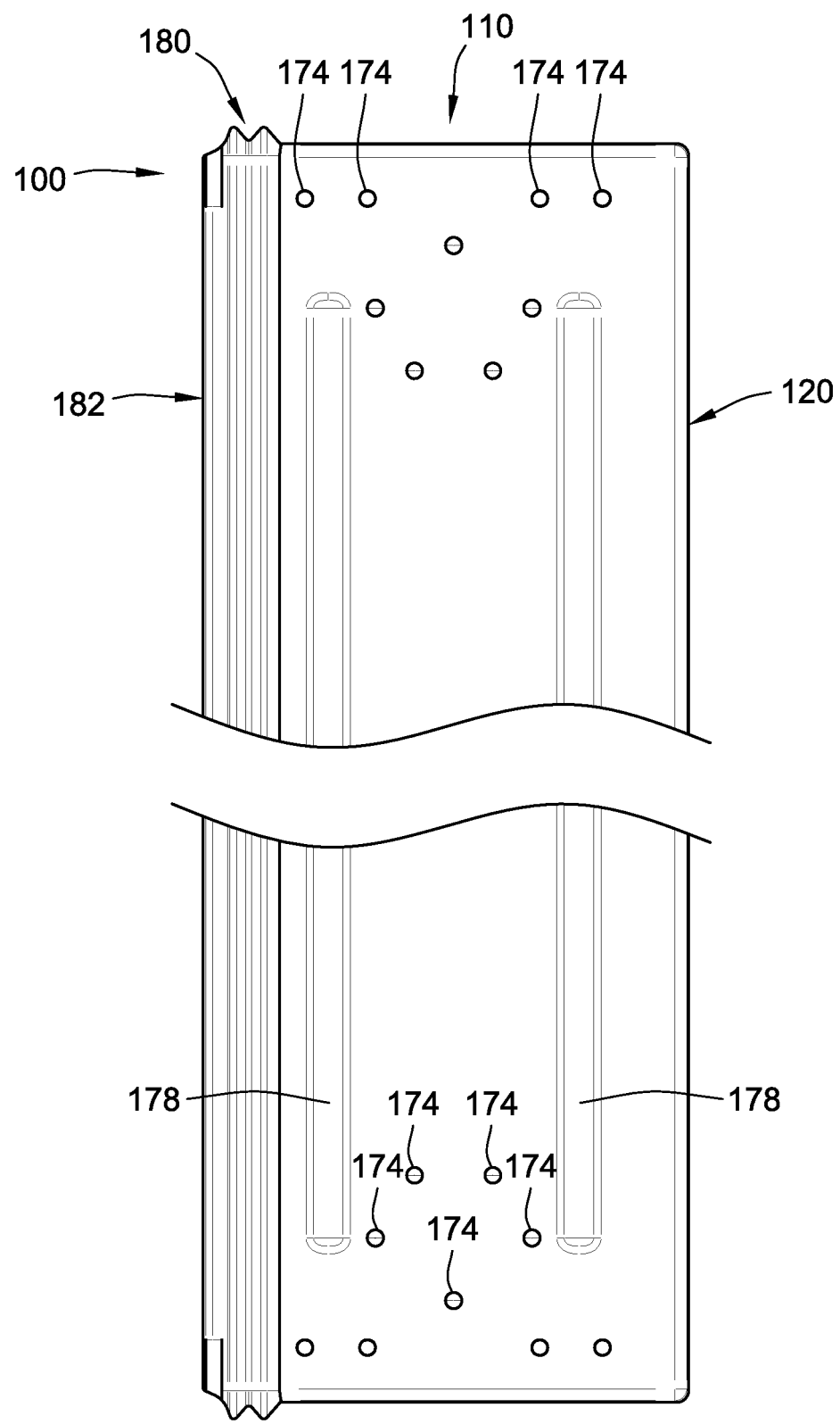
FIG. 12 depicts a side panel of the molded border frame according to the embodiment shown in FIG. 1.

FIG. 12 depicts a view of one side panel 120 of the finished molded filter cartridge 100. As can be seen in FIG. 12, the ends of the side panel 120 feature a plurality of positioning holes 174 that relate to the position of the locating pins 162 and the end pins 164. Additionally, the ridges 165 from the molds 152 (as shown in FIG. 14) create channels 178 that are spatially disposed across the width of the side panels 120. The channels 178 provide an aesthetic feature and also reduce the amount of molding material used.

Figure 13:
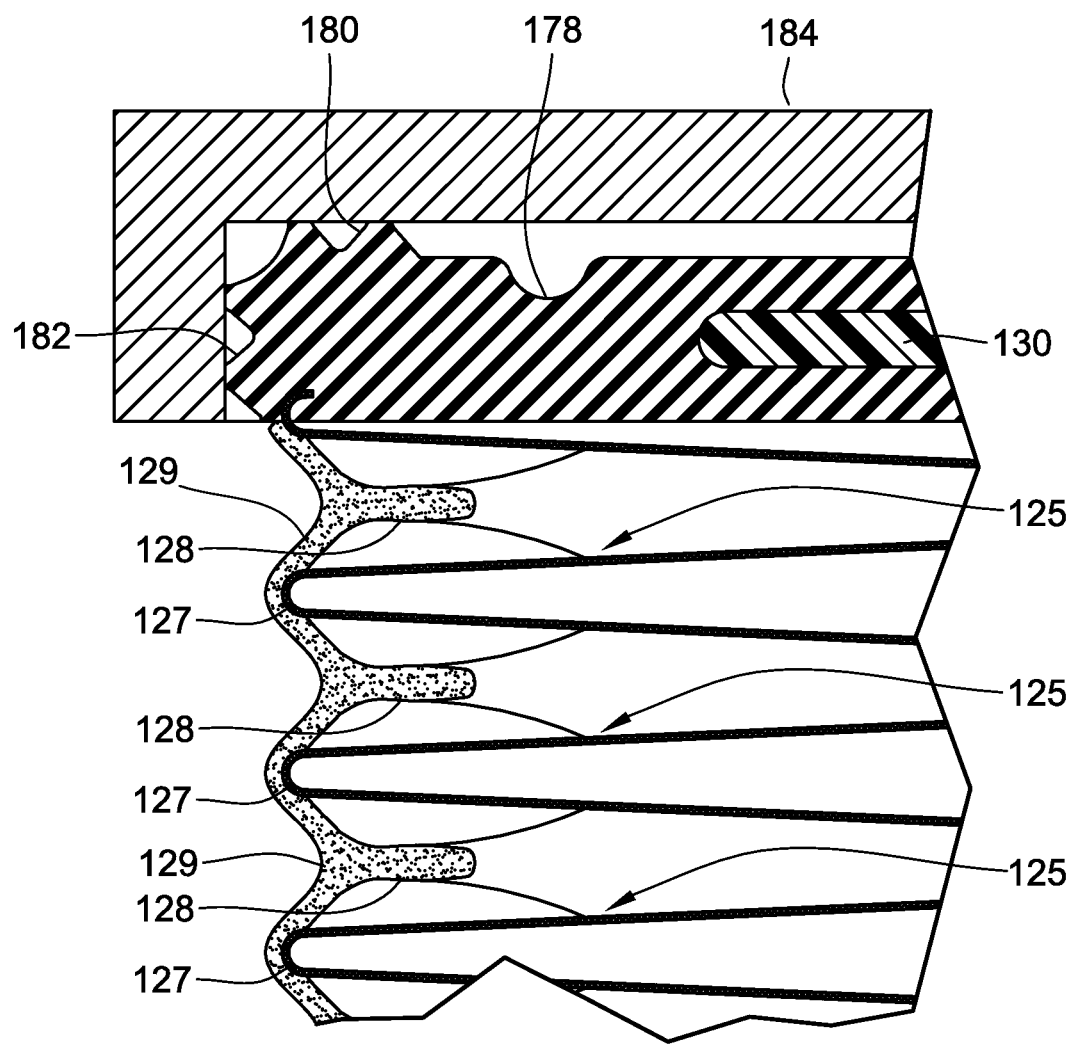
FIG. 13 depicts a partial cross-sectional illustration of the filter cartridge of FIG. 1 contacting and sealing against a filter housing according to an exemplary embodiment.

Additionally, the first double channel 166 creates a radial seal 180. As shown in FIG. 12, using a double channel to create the radial seal 180 provides two contact lines for sealing the filter cartridge to a filter housing. This creates redundancy in the sealing arrangement in the event that one contact line is broken, such as during normal wear and tear. Similarly, the second double channel 167 creates an axial seal 182, which can be seen in FIGS. 2 and 5-7, on the outlet sides of the filter cartridge 100. The axial seal 182 also provides two contact lines for sealing so as to create redundancy in the sealing arrangement, or if one is incorrectly molded at one or more locations. FIG. 13 depicts the radial seal 180 and the axial seal 182 contacting a filter housing 184. In an embodiment, the radial seal 180 and the axial seal 182 project from the border frame 110 a distance of between 2 millimeters and 10 millimeters.

Providing an integrally molded radial seal 180 and axial seal 182 addresses the problem sealing the filter cartridge 100 to the filter housing 184. Conventional filter cartridges use wiper inserts to create this seal. However, the wiper inserts create gaps at the corners, which create leak paths around the filter cartridge.

The above discussion of the molding procedure considered primarily a single molding material for forming the side panels 120 including the radial seal 180 and the axial seal 182. However, the radial seal 180 and axial seal 182 can be made of a different material than the rest of the side panel 120. In one embodiment, the radial seal 180 and axial seal 182 are made of a softer material than the rest of the side panel 120. In a particular embodiment, the radial seal 180 and axial seal 182 have a Shore00 durometer rating of 20 less than the Shore00 durometer rating of the rest of the side panel 120. In this way, the radial seal 180 and the axial seal 182 are more compressible than the rest of the side panel 120 such that the radial seal 180 and the axial seal 182 are better able to form a tight engagement with the filter housing 184 while the rest of the side panel 120 provides better structural rigidity. In other embodiments, the Shore00 durometer rating of the radial seal 180 and axial seal 182 is 30 less than the rest of the side panel 120; and in another embodiment, the Shore00 durometer rating is 50 less.

Figure 16:
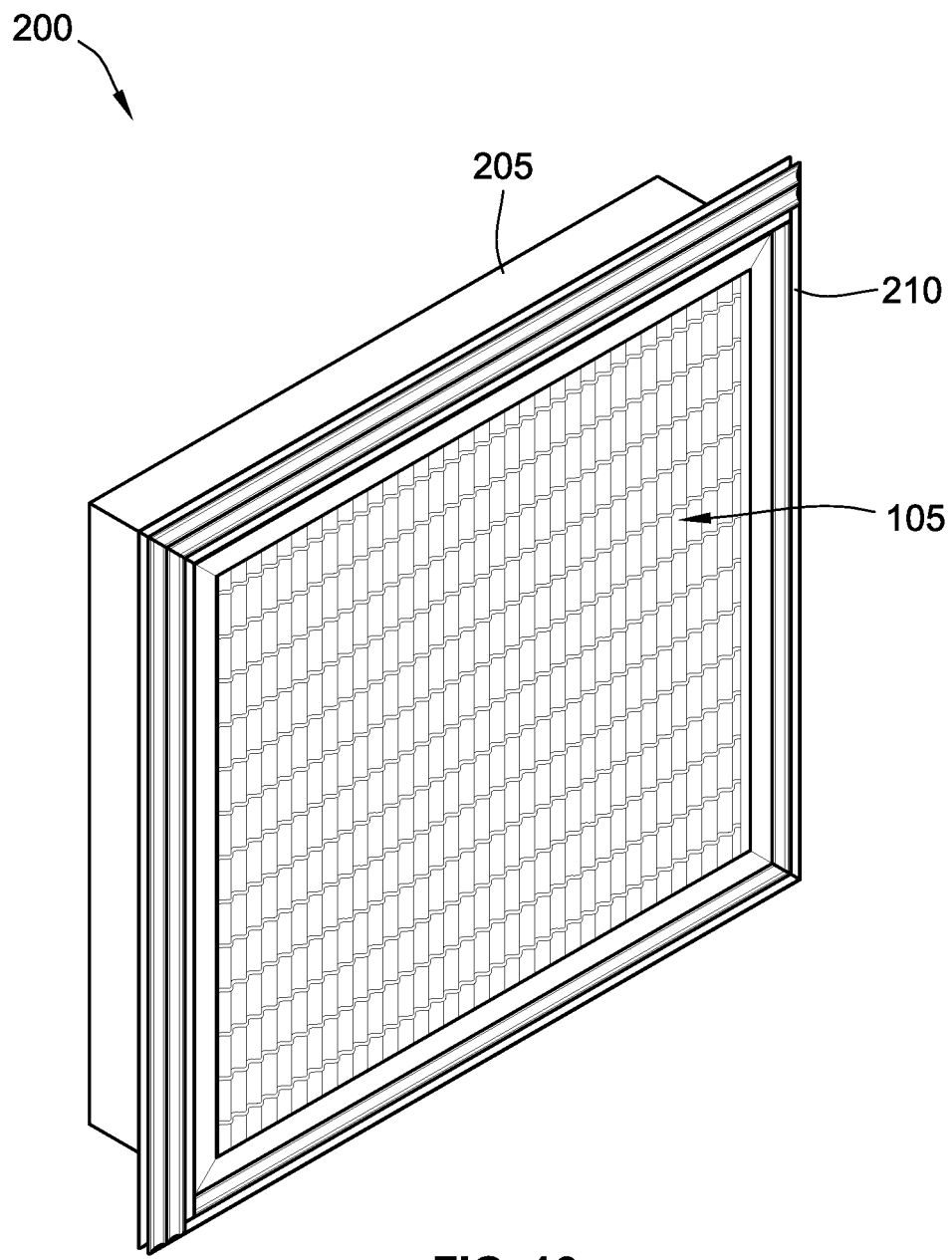
FIG. 16 depicts an isometric view of an alternative embodiment of a headered filter element according to an exemplary embodiment.

In another embodiment shown in FIG. 16, a filter cartridge 200 has a box region 205 and headered region 210. The filter cartridge 200 has a filter element 105 that is substantially similar to the previously described embodiment. In this embodiment, the headered region 210 has a larger width and height than the box region 205. The headered region 205 has a thickness of between 0.75 and 1 inch. The headered region 210 slides onto a lip or track of a filter housing or is otherwise secured against a flat surface surrounding an air passage. In this way, the box region 205 extends outwardly from the filter housing.

Figure 17A:
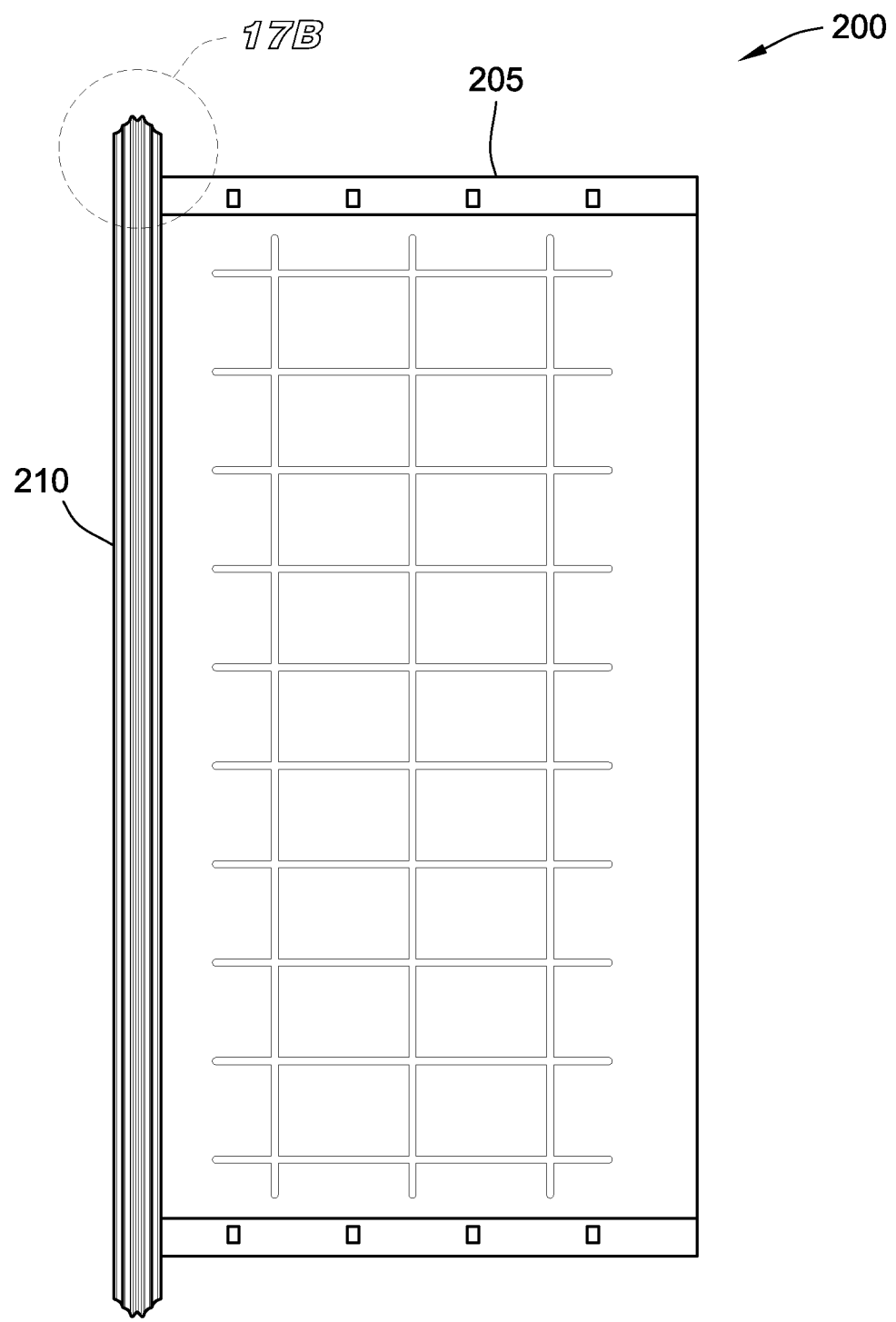
FIG. 17A depicts a plan view of a side of the headered filter element of FIG. 16.

FIG. 17A shows a plan view of a side of the headered filter cartridge 200. FIG. 17B shows a partial sectional view of the headered region 210 of the filter cartridge 200. As depicted in FIG. 17B, the headered region 210 features a radial seal 180 on the top surface of the headered region 210. The axial faces of the headered region 210 each feature an axial seal 182, 182'. These axial seals 182, 182' ensure that the headered region 210 make tight physical contact with the lip, track, or securing surface of the filter housing. As with the previous embodiment, the radial seal 180 and the axial seals 182, 182' feature a double ridge construction so as to provide a redundant seal surface. In a preferred embodiment, each axial seal has a thickness of between $3/16$ and $1/4$ inches.

In preferred embodiment, the side panels of the headered filter cartridge are each molded independently one at time. In certain embodiments, the side panels of the headered region 210 and the box region 205 are molded together at the same time. However, in other embodiments, the headered region 210 and box region 205 can be molded in separate steps such that a side of the box region 205 is molded first followed by a corresponding side of the headered region 210. Alternatively, each side of the box region 205 can be molded independently and each side of the headered region 210 can be molded independently. Then the finished headered region 210 can be joined to the finished box region 205.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter cartridge, comprising:
 a filter element comprising a filter media, the filter element extending between an inlet face and an outlet face, the filter element defining a periphery surrounding the filter media; and
 a border frame comprising a plurality of side panels, the side panels being independently molded-in-place along the periphery of the filter element, adjacent members of the side panels being joined together along a plurality of mold interface seams, the mold interface seams being spaced around the periphery, the plurality of side panels being embedded in and sealing the periphery of the filter element such that fluid flow inside the border frame is directed to pass through the filter media for filtering in order to pass from the inlet face to the outlet face, wherein the border frame includes a molded seal comprising seal sections that are separately and independently molded and joined at a plurality of mold interface seams, each separately molded seal section defined by one of the side panels, each separately molded seal section joined and aligned with two adjacent members of the seal sections, the seal sections being unitarily molded with a remainder of each side panel and not separately, attached the side panels and the seal being unitarily molded together with a polymeric material have a Shore00 durometer of between 20 and 70; and wherein said molded seal comprises a plurality of molded seal members in spaced relation, each molded seal member being in the form of a seal projection forming a ring around the border frame.

2. The filter cartridge of claim 1, wherein the filter element comprises a pleated filter media pack, the pleated filter media pack comprising a plurality of pleats, the pleats including a plurality of pleat flanks extending between first pleat tips disposed at the inlet face and second pleat tips disposed at the outlet face.

3. The filter cartridge of claim 2, wherein the filter element is rectangular with four corners, and wherein the plurality of side panels includes four side panels and four mold interface seams, each mold interface seams being proximate and within two inches of one of the four corners.

4. The filter cartridge of claim 1, wherein an outer surface of the border frame defines a surface step of between 1 micron and 1 millimeter as a result of the side panels being independently molded-in-place along the periphery of the filter element, the surface profile step being defined at the mold interface seams and extending from the inlet face to the outlet face.

5. The filter cartridge of claim 1, wherein the filter cartridge is free of metal structural supports and free of plastic structural supports.

6. The filter cartridge of claim 1, wherein inlet face extends in an inlet plane and wherein the outlet face extends in an outlet plane spaced from the inlet face, and wherein the border frame extends between the inlet face and the outlet face and at least coplanar or beyond the inlet plane and the outlet plane.

7. The filter cartridge of claim 6, wherein each of the side panels comprise a molded exterior surface facing away from the filter element, a molded inlet edge surface extending over and above the inlet plane, and molded outlet edge surface extending over and above the outlet plane, and an irregular expanded surface into which the filter element is embedded and sealed, the molded exterior surface extending between and connecting between the molded outlet edge surface and the molded inlet edge surface, and wherein each side panel defines an average depth between the molded exterior surface and the irregular expanded surface of between ⅛ inch and 2 inches.

8. The filter cartridge of claim 7, wherein the side panels comprise a molded polymeric material comprising at least one of polyurethane, urethane, plastisol, silicone, synthetic rubber, and natural rubber, the polymeric material have a Shore00 durometer of between 20 and 70.

9. The filter cartridge of claim 7, further comprising an axial seal and a radial seal in spaced relation from the axial seal, each of the radial seal and the axial seal being in the form a seal projection forming a ring around the border frame, the axial seal joined to and projecting outward from at least one of the molded inlet edge surface and the molded outlet edge surface, the radial seal projecting outward from the molded exterior surface.

10. The filter cartridge of claim 1 wherein the side panels are overmolded over each other at the mold interface seams.

11. The filter cartridge of claim 1, wherein the side panels are embedded and in direct contact with the filter media.

12. The filter cartridge of claim 1, wherein the filter media has at least the following properties:

a basis weight of between 0.3 and 3.0 ounces/square yard;

an air permeability of between 10 and 50 cfm @ ½ inch of water column pressure, measured according to ASTM D737; and a MERV (Minimum Efficiency Reporting Value) rating of between 5 and 16 according to ASHRAE 52.1.

13. The filter cartridge of claim 12, wherein the filter media is embossed media having a plurality of embossments extending between the inlet face and the outlet face, and further comprising adhesive seal beads applied to the filter media and supporting and maintaining the filter element in a predetermined shape.

14. The filter cartridge of claim 1, the molded seal members include a first axial seal member projecting axially above or below one of the inlet face and outlet face, and a second radial seal member projecting radially and transversely relative to the first axial seal member radially outwardly from the filter element.

15. The filter cartridge of claim 1, wherein the plurality of molded seal members in spaced relation comprise at least one pair of: (i) at least two axial seals and (ii) at least two radial seals, the at least one pair arranged to back each other up in the event of molding imperfections.

16. The filter cartridge of claim 1, wherein the molded seal extends continuously and uninterrupted without gaps around the border frame to provide a full seal, and wherein the seal comprises a seal projection forming a ring around the border frame and projecting from an outer base surface defined by the border frame an axial or radial distance of between 2 millimeters and 10 millimeters.

17. The filter cartridge of claim 1, further comprising a headered region having a both a length and a width greater than a length and a width of the border frame such that the headered region defines two axial faces around the border frame, wherein the headered region has a thickness defining a radial surface around the border frame and wherein each axial face includes an axially projecting seal and the radial surface features a radially projecting seal.

18. The filter cartridge of claim 1, wherein the seal sections are molded from a different material than the rest of the side panel.

19. The filter cartridge of claim 18, wherein the seal sections are molded from a softer material than the rest of the side panel.

20. The filter cartridge of claim 19, wherein the seal sections have a Shore00 durometer of 20 or less than the Shore00 durometer of the rest of the side panel.

21. The filter cartridge of claim 1, wherein the seal members and the filter media are sufficient to provide HEPA (High Efficiency Particulate Air) filtration according to IEST RP-CC001 when the filter cartridge is inserted into a filter housing.

22. A filter cartridge, comprising:
   a filter element comprising a filter media, the filter element extending between an inlet face and an outlet face, the filter element defining a periphery surrounding the filter media; and
   a border frame comprising a plurality of side panels, the side panels being independently molded-in-place along the periphery of the filter element, adjacent members of the side panels being joined together along a plurality of mold interface seams, the mold interface seams being spaced around the periphery, the plurality of side panels being embedded in and sealing the periphery of the filter elemnet such that fluid flow inside the border frame is directed to pass through the filter media for filtering in order to pass from the inlet face to the outlet face;
   wherein the filter element comprises a pleated filter media pack, the pleated filter media pack comprising a plurality of pleats, the pleats including a plurality of pleat flanks extending between first pleat tips disposed at the inlet face and second pleat tips disposed at the outlet face;
   wherein the filter element is rectangular with four corners, and wherein the plurality of side panels includes four side panels and four mold interface seams, each mold interface seams being proximate and within two inches of one of the four corners; and
   wherein the side panels have non-linear ends at each seam, wherein the non-linear ends form a geometric and mechanical interlock at each seam.

23. The filter cartridge of claim 22, wherein the non-linear ends are dovetail joints, each dovetail joint comprising at least one tongue and at least one groove that are interlocking.

24. A filter cartridge, comprising:
   a filter element comprising a filter media, the filter element extending between an inlet face and an outlet face, the filter element defining a periphery surrounding the filter media; and
   a border frame comprising a plurality of side panels, the side panels being independently molded-in-place along the periphery of the filter element, adjacent members of the side panels being joined together along a plurality of mold interface seams, the mold interface seams being spaced around the periphery, the plurality of side panels being embedded in and sealing the periphery of the filter element such that fluid flow inside the border frame is directed to pass through the filter media for filtering in order to pass from the inlet face to the outlet face;
   further comprising structural support inserts embedded in the side panels.

25. The filter cartridge of claim 24, wherein each structural support insert is embedded in only 1 of the side panels and spans a length of at least 75% therein.

26. The filter cartridge of claim 25, wherein each structural support insert spans not more than 95% of said length.

27. The filter cartridge of claim 24, wherein the structural support inserts comprise support panels formed of wooden material having a thickness in a range of between ⅛ inch and ½ inch.

28. The filter cartridge of claim 27, wherein the support panels are fully encapsulated in a polymeric material of the side panels, further comprising alignment and positioning holes extending to a surface of the support panels, the alignment and positioning holes formed in the side panels formed as a result locating pins extending from a mold during molding.

29. The filter cartridge of claim 27, wherein the support panels are solid and free of apertures.

30. A filter cartidge, comprising:
   a filter element comprising a filter media, the filter element extendinig between an inlet face and an outlet face, the filter element defining a periphery surrounding the filter media; and
   a border frame comprising a plurality of side panels, the side panels being independently molded-in-place along the periphery of the filter element, adjacent members of the side panels being joined together along a plurality of mold interface seams, the mold interface seams being spaced around the periphery, the plurality of side panels being embedded in and sealing the periphery of the filter element such that fluid flow inside the border frame is directed to pass through the filter media for filtering in order to pass from the inlet face to the outlet face;
   wherein the border frame comprises a polymeric material molded in place to the filter element, the border frame defining a plurality of sides in surrounding relation of the filter element; and
   wherein a plurality of support panels are embedded in the border frame.

31. The filter cartridge of claim 30, wherein the support panels are fully encapsulated within the polymeric material of the border frame, the polymeric material defining an outer exterior surface facing away from the filter element, an upstream periphery at the inlet face and a downstream periphery at the outlet face for the border frame, and wherein the sides are joined at corners, and wherein each support panel extends at least 75% of a length between corners for a corresponding one of the sides.

32. The filter cartridge of claim 31, wherein each support panel extends no greater than 95% of the length.

33. The filter cartridge of claim 30, wherein each of the support panels span a width of between 5% and 50% of a width span between the upstream periphery and the downstream periphery.

34. The filter cartridge of claim 30, wherein the polymeric material comprises at least one of polyurethane, urethane, plastisol, silicone, synthetic rubber, and natural rubber the polymeric material have a Shore00 durometer of between 20 and 70.

35. The filter cartridge of claim 30, wherein the support panels are fully encapsulated in a polymeric material of the sides, further comprising alignment and positioning holes extending into a surface of the sides, the alignment and positioning holes formed in the sides as a result locating pins extending from a mold during molding.

36. A filter cartridge, comprising:
   a filter element comprising a filter media, the filter element extending between an inlet face and an outlet face, the filter element defining a periphery surrounding the filter media; and
   a border frame comprising a plurality of side panels, the side panels being independently molded-in-place along the periphery of the filter element, adjacent members of the side panels being joined together along a plurality of mold interface seams, the mold interface seams being spaced around the periphery, the plurality of side panels being embedded in and sealing the periphery of the filter element such that fluid flow inside the border frame is directed to pass through the filter media for filtering in order to pass from the inlet face to the outlet face;

wherein the border frame comprises a polymeric material molded in place to the filter element, the border frame defining a plurality of sides in surrounding relation of the filter element; and wherein the filter cartridge further comprises a plurality of molded seal members in spaced relation and integrally formed of the polymeric material as part of the border frame, each molded seal member being in the form of a seal projection forming a ring around the border frame.

37. The filter cartridge of claim 36, wherein the seal members include an axial seal and a radial seal in spaced relation from the axial seal, the axial seal joined to and projecting outward from at least one of a molded inlet edge surface and a molded outlet edge surface of the border frame, the radial seal projecting outward from a molded exterior surface of the border frame, the molded exterior surface extending between the molded inlet edge surface and the molded outlet edge surface.

38. The filter cartridge of claim 36, wherein the plurality of molded seal members in spaced relation comprise at least one pair of: (i) at least two axial seals and (ii) at least two radial seals, the at least one pair arranged to back each other up in the event of molding imperfections.

39. The filter cartridge of claim 38, wherein the first cartridge includes both a pair of at least two axial seals, and a pair of at least two radial seals.

40. The filter cartridge of claim 36, wherein the molded seal members extend continuously and uninterrupted without gaps around the border frame to provide a full seal, and wherein the seal comprises a seal projection forming a ring around the border frame and projecting from an outer base surface defined by the border frame an axial or radial distance of between 2 millimeters and 10 millimeters.

* * * * *

UNITED STATES PATENT AND TRADEMARK OFFICE
CERTIFICATE OF CORRECTION

PATENT NO. : 11,033,846 B2
APPLICATION NO. : 16/076579
DATED : June 15, 2021
INVENTOR(S) : Daniel R. Haas et al.

It is certified that error appears in the above-identified patent and that said Letters Patent is hereby corrected as shown below:

In the Claims

Claim 1, Line 25 delete "separately, attached the side panels and the seal being" and insert --separately attached, the side panels and the seal being--

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*